(12) United States Patent
Yin et al.

(10) Patent No.: US 11,561,430 B2
(45) Date of Patent: Jan. 24, 2023

(54) DISPLAY DEVICE AND CONTROL METHOD THEREOF

(71) Applicant: Xiamen Tianma Micro-Electronics Co., Ltd., Xiamen (CN)

(72) Inventors: Zhaodi Yin, Wuhan (CN); Yangzhao Ma, Wuhan (CN); You Gao, Shanghai (CN); Jian Wu, Wuhan (CN); Kaen Jiang, Wuhan (CN); Zhenkai Yang, Wuhan (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/232,362

(22) Filed: Apr. 16, 2021

(65) Prior Publication Data

US 2021/0255505 A1 Aug. 19, 2021

(30) Foreign Application Priority Data

Dec. 22, 2020 (CN) .......................... 202011529930.8

(51) Int. Cl.
*G02F 1/1335* (2006.01)

(52) U.S. Cl.
CPC .. *G02F 1/133528* (2013.01); *G02F 1/133512* (2013.01)

(58) Field of Classification Search
None
See application file for complete search history.

(56) References Cited

U.S. PATENT DOCUMENTS

| | | | | |
|---|---|---|---|---|
| 2013/0063676 A1* | 3/2013 | Tsuchihashi | ........ | G02F 1/13318 349/54 |
| 2017/0053602 A1* | 2/2017 | Chang | ................. | G09G 3/3648 |
| 2018/0240378 A1* | 8/2018 | Chen | ......................... | G09F 9/33 |
| 2019/0051864 A1* | 2/2019 | Xu | ........................ | G09G 3/3208 |
| 2020/0244787 A1* | 7/2020 | Gu | .................... | G02F 1/133512 |
| 2020/0365667 A1* | 11/2020 | Jo | ........................ | H01L 27/3234 |
| 2021/0356788 A1* | 11/2021 | Zha | .................. | G02F 1/133615 |
| 2021/0397054 A1* | 12/2021 | Zhong | ............... | G02F 1/136286 |
| 2022/0013597 A1* | 1/2022 | Liu | ...................... | H01L 27/3234 |
| 2022/0030146 A1* | 1/2022 | Lin | ..................... | H01L 51/5293 |
| 2022/0059042 A1* | 2/2022 | Ogawa | ...................... | G09F 9/30 |

FOREIGN PATENT DOCUMENTS

| | | | | |
|---|---|---|---|---|
| CN | 104914498 A | | 9/2015 | |
| CN | 106997931 A | | 8/2017 | |
| CN | 108429882 A | * | 8/2018 | .......... H04N 5/2253 |

\* cited by examiner

*Primary Examiner* — Shan Liu

(74) *Attorney, Agent, or Firm* — von Briesen & Roper, s.c.

(57) ABSTRACT

Provided are a display device and a control method thereof. The polarizer is disposed on a light-emitting side of the display panel, and the imaging module is disposed on a non-light-emitting side of the display panel. The display panel includes a first display region, and in a direction perpendicular to the polarizer, the polarizer covers the first display region and the imaging module at least partially overlaps the first display region. The polarizer includes a polarized state and an unpolarized state, and a light transmittance of the polarizer in the unpolarized state is greater than a light transmittance in the polarized state. The first reaction light emitting unit emits a first reaction light to the first display region. The polarizer includes a light sensitive structure, and the light sensitive structure adjusts the polarizer from the polarized state to the unpolarized state under the action of the first reaction light.

17 Claims, 25 Drawing Sheets

DISPLAY DEVICE AND CONTROL METHOD THEREOF

CROSS-REFERENCE TO RELATED APPLICATION

This application claims priority to Chinese Patent Application No. 202011529930.8 filed Dec. 22, 2020, the disclosure of which is incorporated herein by reference in its entirety.

TECHNICAL FIELD

Embodiments of the present disclosure relate to the field of display technologies and, to in particular, a display device and a control method thereof.

BACKGROUND

For electronic products, the arrangement of an imaging module such as a front camera inevitably occupies a certain space, thus affecting a screen ratio of a display panel. However, in order to achieve a real full screen, researchers consider an implementation scheme that the imaging module is disposed under the display panel. The imaging module such as a camera is disposed below a light-emitting component of the display panel. That is to say, the imaging module is disposed within a display region, a position where the imaging module is located can normally display, and when the imaging module is required, the light passes through the display panel and reaches the imaging module such that the light is finally utilized by the imaging module. In order to ensure the performance of the imaging module, it is an urgent problem to increase the amount of external ambient light that can be received by the imaging module.

SUMMARY

The present disclosure provides a display device and a control method thereof so as to improve the performance of an imaging module.

In one aspect, embodiments of the present disclosure provide a display device, including a display panel, a polarizer, an imaging module and a first reaction light emitting unit. The polarizer is disposed on a light-emitting side of the display panel, and the imaging module is disposed on a non-light-emitting side of the display panel.

The display panel includes a first display region, and in a direction perpendicular to the polarizer, the polarizer covers the first display region and the imaging module is at least partially overlapped with the first display region.

The polarizer includes a polarized state and an unpolarized state, and a light transmittance of the polarizer in the unpolarized state is greater than a light transmittance of the polarizer in the polarized state.

The first reaction light emitting unit is configured to emit a first reaction light to the first display region.

The polarizer includes a light sensitive structure, and the light sensitive structure is configured to adjust the polarizer from the polarized state to the unpolarized state under the action of the first reaction light.

In another aspect, embodiments of the present disclosure further provide a control method for the display device, and the control method is applied to the display device described in the first aspect and includes steps described below.

An imaging demand signal is acquired.

A first reaction light emitting unit is controlled to emit a first reaction light to a polarizer according to the imaging demand signal, such that the polarizer is adjusted from a polarized state to an unpolarized state.

DETAILED DESCRIPTION

Figure 1:
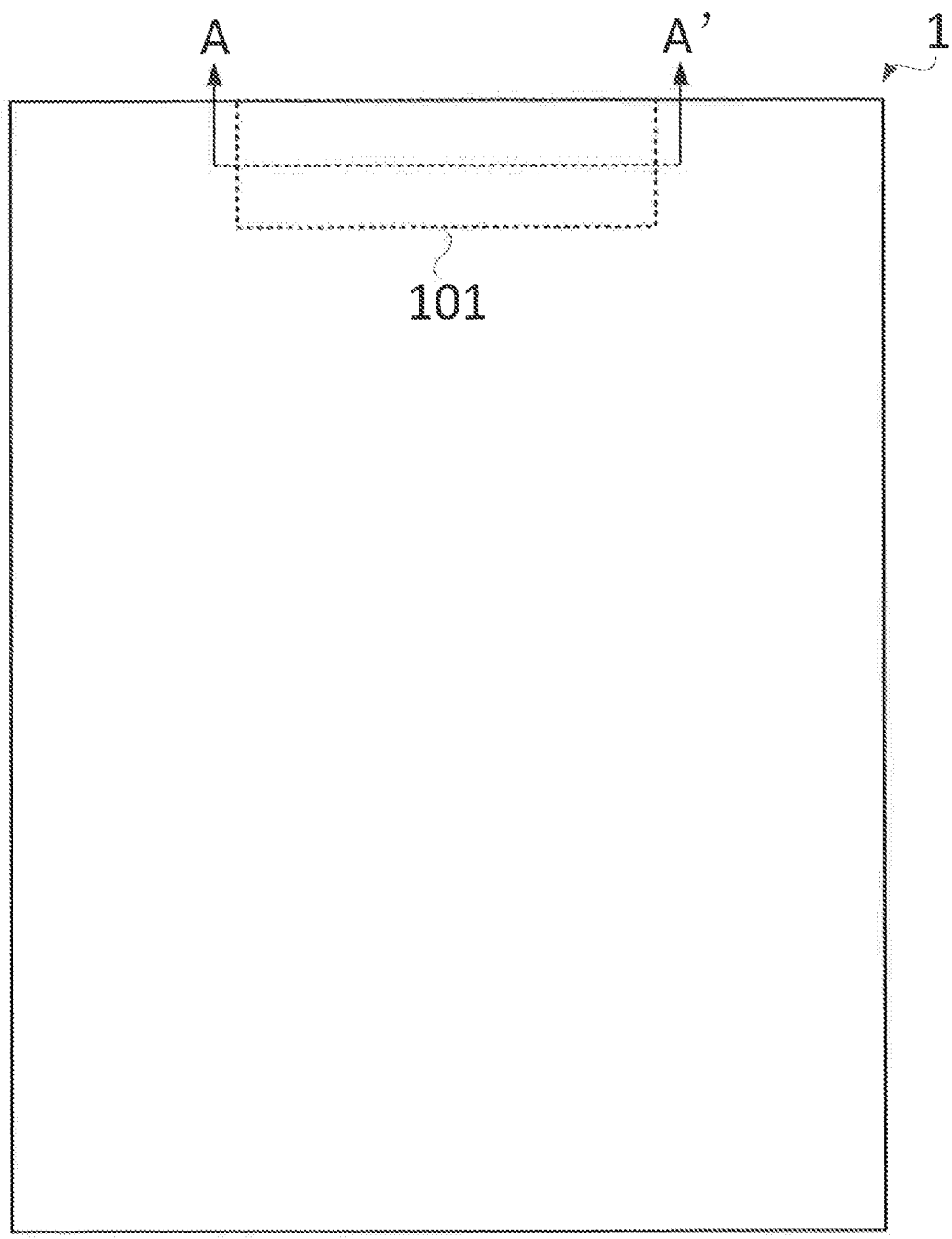
FIG. 1 is a structure view of a display device according to an embodiment of the present disclosure.

Hereinafter the present disclosure will be further described in detail in conjunction with the drawings and embodiments. It is to be understood that the specific embodiments set forth herein are merely intended to illustrate and not to limit the present disclosure. Additionally, it is to be noted that for ease of description, merely part, not all, of the structures related to the present disclosure are illustrated in the drawings.

Figure 2:
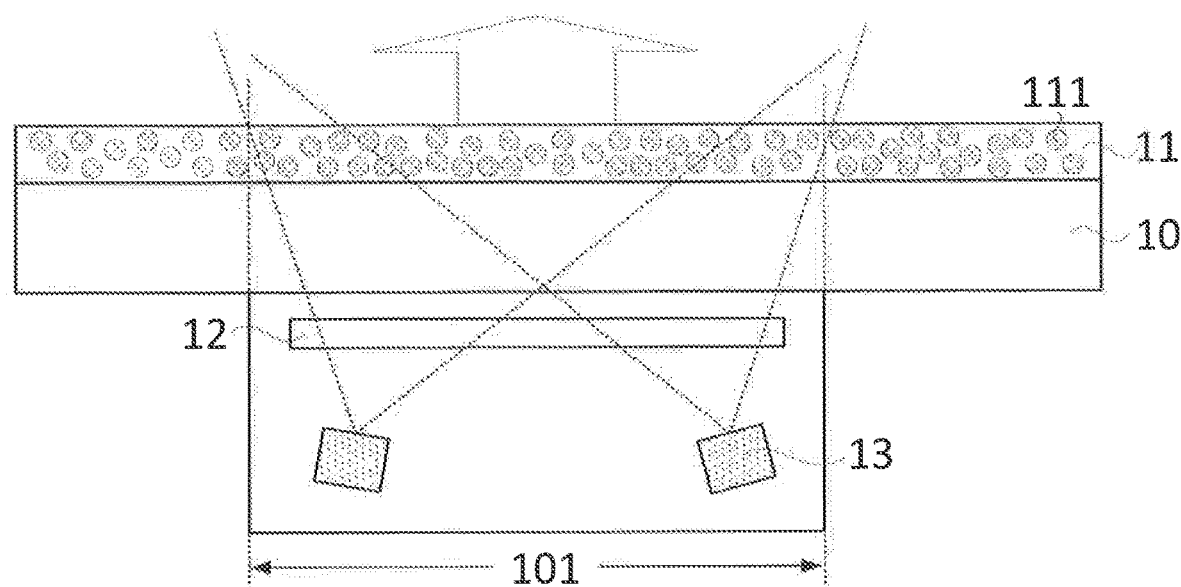
FIG. 2 is a sectional structure view taken along A-A' of FIG. 1.

FIG. 1 is a structure view of a display device according to an embodiment of the present disclosure. FIG. 2 is a sectional structure view taken along A-A' of FIG. 1. As shown in FIG. 1 and FIG. 2, a display device 1 provided by embodiments of the present disclosure includes a display panel 10, a polarizer 11, an imaging module 12 and a first reaction light emitting unit 13. The polarizer 11 is disposed on a light-emitting side of the display panel 10, and the imaging module 12 is disposed on a non-light-emitting side of the display panel 10. The display panel 10 includes a first display region 101, and in a direction perpendicular to the polarizer 11, the polarizer 11 covers the first display region 101, and the imaging module 12 is at least partially overlapped with the first display region 101. The polarizer 11 includes a polarized state and an unpolarized state, and a light transmittance of the polarizer 11 in the unpolarized state is greater than a light transmittance of the polarizer 11 in the polarized state. The first reaction light emitting unit 13 is configured to emit first reaction light to the first display region 101. The polarizer 11 includes a light sensitive structure 111, and the light sensitive structure 111 is configured to adjust the polarizer 11 from the polarized state to the unpolarized state under the action of the first reaction light.

As shown in FIG. 1 and FIG. 2, the polarizer 11 is disposed on the light-emitting side of the display panel 10, and through optical design, the polarizer 11 changes a light vector direction or rotation direction of the external natural light entering the display panel 10 such that the effect that the external light can enter but cannot exit the display panel is achieved. In this way, the effective light emitted by the display panel 10 is not interfered with by the external natural light, and the display image is clear and bright, thereby improving the user's experience.

The imaging module 12 is disposed on the non-light-emitting side of the display panel 10. The display panel 10 includes the first display region 101, and in the direction perpendicular to the polarizer 11, the polarizer 11 covers the first display region 101, and the imaging module 12 is at least partially overlapped with the first display region 101. The imaging module 12 may be any photosensitive element such as a camera. In the first display region 101, the external natural light from the light-emitting side of the display panel 10 passes through the polarizer 11 and the display panel 10, and then reaches the imaging module 12, the imaging module 12 converts the external natural light into an electrical signal, and then an image is generated according to the electrical signal generated by the imaging module 12.

The display device 1 is further provided with the first reaction light emitting unit 13, the first reaction light emitting unit 13 emits the first reaction light to the first display region 101, the light sensitive structure 111 in the polarizer 11 enables the polarizer 11 to be adjusted from the polarized state to the unpolarized state under the action of the first reaction light, and the light transmittance of the polarizer 11 in the unpolarized state is greater than the light transmittance of the polarizer 11 in the polarized state.

In an embodiment, the polarizer 11 can effectively eliminate the influence of external light and thus improve the quality, but the polarizer has only 40% light transmittance, and 40% light transmittance seriously affects the imaging module 12. More specifically the imaging module 12 receives the external natural light when the imaging module 12 works, resulting in less light flux of the external natural light incident into the imaging module 12 and poor imaging effect of the imaging module 12. Therefore, when the display device 1 displays an image, the polarizer 11 is in the polarized state, so that the effective light emitted by the display panel 10 is not interfered by the external natural light and the display image is clear and bright, thereby improving the user's use experience. When the display device 1 performs camera shooting, the first reaction light emitting unit 13 emits the first reaction light to the first display region 101. At this time, the light sensitive structure 111 in the polarizer 11 enables the polarizer 11 to be adjusted from the polarized state to the unpolarized state under the action of the first reaction light, the light transmittance of the polarizer 11 in the first display region 101 is increased, and the external natural light incident on the imaging module 12 is increased, thereby improving the imaging effect of the imaging module 12.

In the display device provided by the embodiments of the present disclosure, the first reaction light emitting unit 13 is disposed in the display device 1. When the imaging module 12 works, the first reaction light emitting unit 13 emits the first reaction light to the first display region 101 such that the light sensitive structure 111 in the polarizer 11 enables the polarizer 11 to be adjusted from the polarized state to the unpolarized state under the action of the first reaction light. Since the light transmittance of the polarizer 11 in the unpolarized state is greater than the light transmittance of the polarizer 11 in the polarized state, the light transmittance of the polarizer 11 in the first display region 101 is increased, and the external natural light incident on the imaging module 12 is increased, thereby improving the imaging effect of the imaging module 12.

In an embodiment, the light sensitive structure 111 includes iodine particles. In the polarized state, the iodine particles have a first state, and include $I_3^-$ ions and $I_5^-$ ions in the first state; and in the unpolarized state, the iodine particle have a second state, and include $I_2$ molecules and $I^-$ ions in the second state.

In an embodiment, the polarizer 11 includes iodine particles. When the display device displays an image, the polarizer 11 is in the polarized state, iodine particles mostly exist in the form of polyiodine ions such as $I_3^-$ ions and $I_5^-$ ions, and the polyiodine ions can absorb light in the range of visible light according to forms of the polyiodine ions, such that the polarizer 11 can be colored. At this time, the polarizer has a polarization function, so that the effective light emitted by the display panel 10 is not interfered with by the external natural light and the display image is clear and bright, thereby improving the user's experience. When the display device performs camera shooting, the first reaction light emitting unit 13 emits the first reaction light to the first display region 101. At this time, the $I_3^-$ ions and $I_5^-$ ions that play a polarizing role in the polarizer 11 are decomposed into $I_2$ molecules and $I^-$ ions under the action of the first reaction light, and the $I_2$ molecules and $I^-$ ions do not substantially participate in the absorption of visible light, such that the performance of the polarizer 11 is changed, and the polarizer 11 is adjusted from the polarized state to the unpolarized state, and loses the polarization function to be transparent. In this way, the light transmittance of the polarizer 11 in the first display region 101 is increased, and the external natural light incident on the imaging module 12 is increased, thereby improving the imaging effect of the imaging module 12.

A reaction formula illustrating that $I_3^-$ ions and $I_5^-$ ions in the polarizer 11 are decomposed into $I_2$ molecules and $I^-$ ions under the action of the first reaction light is described below.

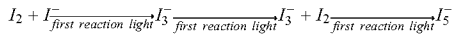

$I_5^-$ ions are decomposed into $I_3^-$ ions and $I_2$ molecules under the action of the first reaction light, and $I_3^-$ ions playing the polarizing role are decomposed into $I_2$ molecules and $I^-$ ions under the action of the first reaction light, such that the polarizer 11 is adjusted from the polarized state to the unpolarized state. Since the reaction is reversible, after the first reaction light emitting unit 13 stops emitting the first reaction light to the first display region 101 for a certain period of time, $I_2$ molecules and $I^-$ ions react with each other so as to generate $I_3^-$ ions and $I_5^-$ ions, such that the polarizer 11 returns to the polarized state again, and image display is achieved.

It is to be noted that since a general polarization includes iodine ions, the polarizer in the embodiment of the present disclosure is a conventional polarizer instead of a polarizer with a special structure or special performance. When the imaging module works, only the first reaction light emitting unit being controlled to emit the first reaction light to the first display region is required, such that the light sensitive structure in the polarizer enables the polarizer to be adjusted from the polarized state to the unpolarized state under the action of the first reaction light, and the external natural light incident on the imaging module is increased, thereby improving the imaging effect of the imaging module. Meanwhile, the display device is simple in structure, matched with the existing display device, low in cost and easy to be achieved, and has a good application prospect.

It is further to be noted that only the light sensitive structure 111 including the iodine particles is described as an example in this embodiment of the present disclosure, and in other embodiments, other light sensitive structures 111 may be adopted according to actual requirements, which is not limited in the embodiments of the present disclosure.

Figure 3:
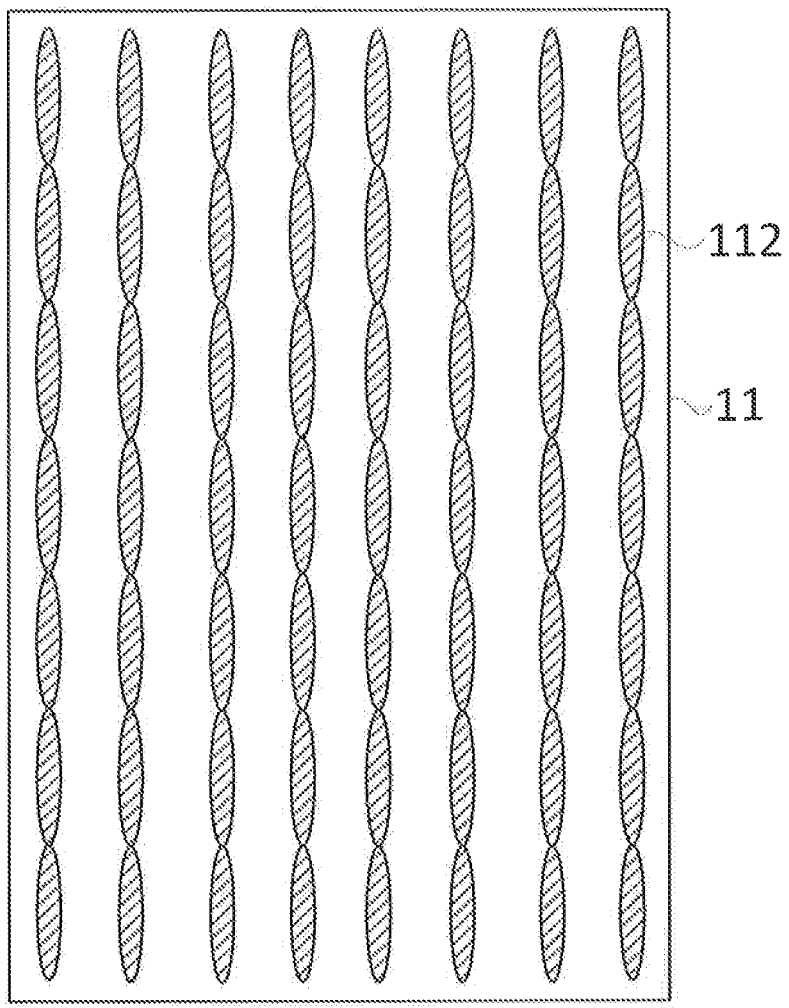
FIG. 3 is a structure view of a polarizer according to an embodiment of the present disclosure.
Figure 4:
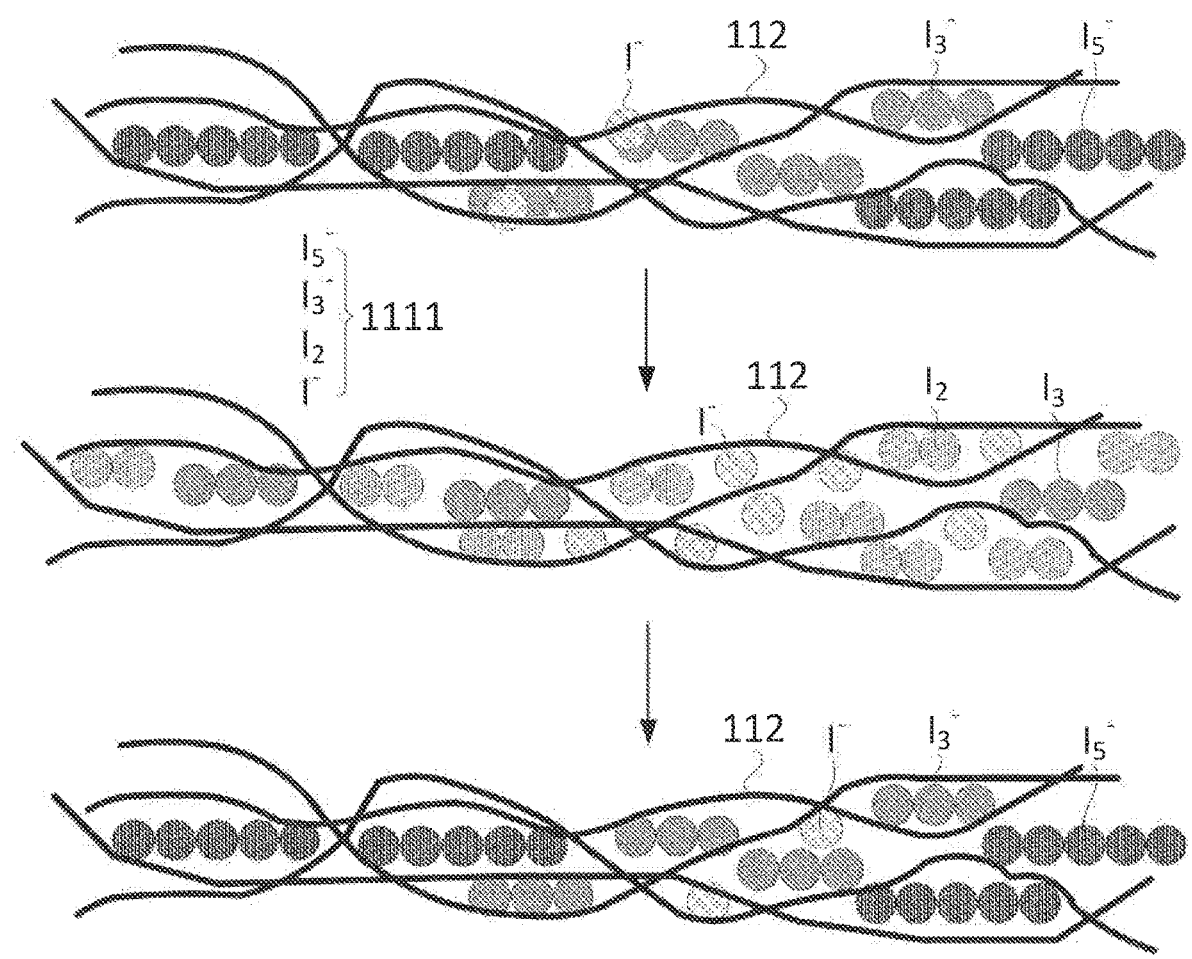
FIG. 4 is a schematic diagram of a state transition of iodine particles according to an embodiment of the present disclosure.

FIG. 3 is a structure view of a polarizer according to an embodiment of the present disclosure. FIG. 4 is a schematic diagram of a state transition of iodine particles according to an embodiment of the present disclosure. As shown in FIG. 3 and FIG. 4, in an embodiment, the polarizer 11 includes a polyvinyl alcohol (PVA) layer, the PVA layer includes a plurality of polyvinyl alcohol molecules 112, and iodine particles 1111 are disposed in a space defined by the plurality of polyvinyl alcohol molecules 112.

As shown in FIG. 3 and FIG. 4, the polyvinyl alcohol layer is made by stretching polyvinyl alcohol doped with iodine particles 1111. In an embodiment, during preparation of the polyvinyl alcohol layer, the polyvinyl alcohol film is first soaked in a solution containing iodine particles 1111, then the polyvinyl alcohol film is stretched in a single axial direction, the polyvinyl alcohol molecules 112 are arranged in one direction after stretched by an external force, and the polyvinyl alcohol molecules 112 and iodine particles 1111 attached to the polyvinyl alcohol molecules 112 are arranged in the same direction. The stretched iodine particle 1111 absorbs light vibrating in a direction parallel to a major axis of the iodine particle 1111, and enables light vibrating in a direction perpendicular to the major axis of the iodine particle 1111 to pass through, thereby achieving a polarizing function.

Since $I_3^-$ ions and $I_5^-$ ions have larger molecular mass when the first reaction light emitting unit 13 does not emit the first reaction light, $I_3^-$ ions and $I_5^-$ ions are fixed in a spatial structure of the polyvinyl alcohol molecule 112 in the polarizer 11; and when the first reaction light emitting unit 13 emits the first reaction light to the first display region 101, $I_3^-$ ions and $I_5^-$ ions are decomposed into $I_2$ molecules and $I^-$ ions with varying degrees, and the reaction formula is described below.

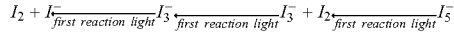

Since the reverse reaction speed is fast, the decomposed $I^-$ ions, $I_2$ molecules and $I_3^-$ ions are still fixed in the spatial structure of the polyvinyl alcohol molecule 112, and at this time, iodine particles 1111 exist in three forms of high concentration $I^-$ ions, $I_2$ molecules and $I_3^-$ ions. The polarizer 11 is adjusted from the polarized state to the unpolarized state, and loses the polarization function to be transparent. In this way, the light transmittance of the polarizer 11 in the first display region 101 is increased, and the external natural light incident on the imaging module 12 is increased, thereby improving the imaging effect of the imaging module 12.

When the first reaction light emitting unit 13 stops emitting the first reaction light, the equilibrium reaction spontaneously generates a forward reaction from a high concentration to a low concentration, and the reaction formula is described below.

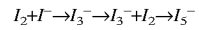

The $I^-$ ions and $I_2$ molecules limited in the spatial structure of the polyvinyl alcohol molecule 112 can be combined into the original structure, namely, macromolecules $I_3^-$ ions and $I_5^-$ ions, such that the polarizer 11 is restored to the polarized state again, and an image display condition is satisfied, thereby achieving the mutual conversion between the polarized state and the unpolarized state.

In other embodiments, those skilled in the art may also replace the polyvinyl alcohol with other high molecular polymers according to actual needs, which is not limited in the embodiments of the present disclosure.

Figure 5:
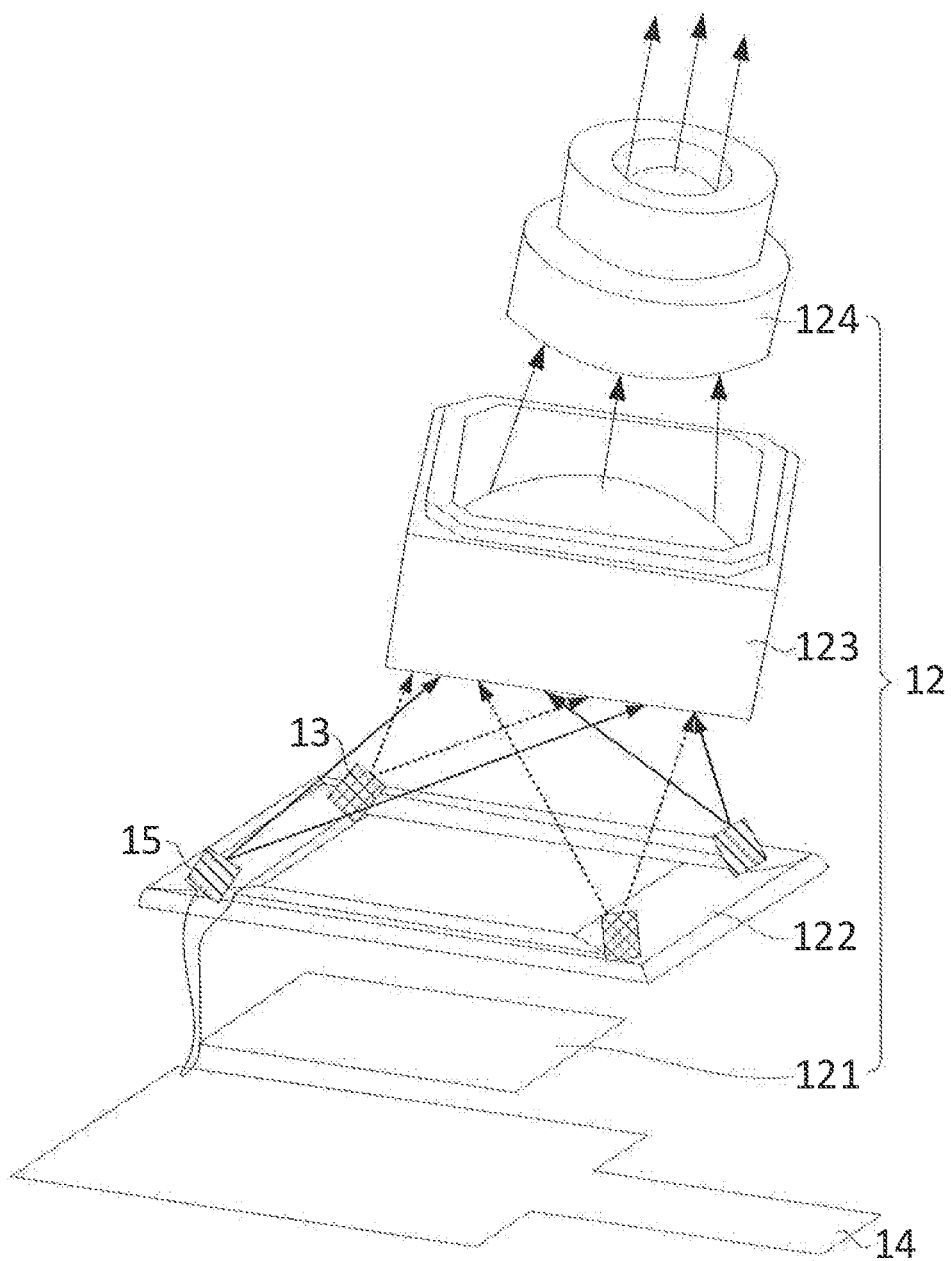
FIG. 5 is an exploded structure view of an imaging module according to an embodiment of the present disclosure.

FIG. 5 is an exploded structure view of an imaging module according to an embodiment of the present disclosure. As shown in FIG. 5, in an embodiment, the imaging module 12 includes a photosensitive chip 121, a supporting frame 122, a focusing aperture 123 and a lens 124, and the first reaction light emitting unit 13 is disposed on the supporting frame 122.

In one embodiment, as shown in FIG. 5, on the structural basis of the imaging module 12 in a conventional mobile phone, the first reaction light emitting unit 13 may be additionally provided. The first reaction light emitting unit 13 may be fixed on the supporting frame 122 adjacent to a flexible printed circuit (FPC) 14 and electrically connected to the flexible printed circuit through a trace, and the opening and closing of the first reaction light emitting unit 13 may be controlled by the flexible printed circuit. The first reaction light emitting unit 13 is integrated with the imaging module 12, such that an integration level is high and the first reaction light emitting unit 13 does not occupy too much space, thereby facilitating the reduction of a volume of the display device.

In an embodiment, when a front camera function of the mobile phone is enabled, the flexible printed circuit preferentially controls the first reaction light emitting unit 13 to be opened such that the first reaction light emitting unit 13 emits the first reaction light to the first display region 101, thereby facilitating $I_3^-$ ions and $I_5^-$ ions in the polarizer 11 being decomposed into $I_2$ molecules and $I^-$ ions. In this way, the polarizer 11 is adjusted from the polarized state to the unpolarized state. After an anti-reflection effect of the first display region 101 is achieved, the first reaction light emitting unit 13 is closed by the flexible printed circuit, and the imaging module 12 returns to a normal working state of camera shooting to complete the camera shooting. Since the light transmittance of the first display region 101 is increased, the external natural light incident on the imaging module 12 is increased, thereby improving the imaging effect of the imaging module 12.

In order to ensure that the first reaction light emitted by the first reaction light emitting unit 13 can pass through the focusing aperture 123 and the lens 124, the focusing aperture 123 is adjusted to the maximum when the first reaction light emitting unit 13 emits the first reaction light.

It is to be noted that the number of first reaction light emitting units 13 and the positions of the first reaction light emitting units 13 may be arranged according to actual requirements, FIG. 5 only describes two first reaction light emitting units 13 being disposed on the supporting frame 122 as an example, and the number of first reaction light emitting units 13 and the positions of the first reaction light emitting units 13 are not limited in the embodiments of the present disclosure.

For example, in other embodiments, the first reaction light emitting unit 13 may also be disposed independently.

The first reaction light emitting unit 13 may be independently disposed around the imaging module 12, so that it is convenient to maintain the first reaction light emitting unit 13 subsequently.

Still referring to FIG. 5, in an embodiment, the display device provided by the embodiments of the present disclosure further includes a second reaction light emitting unit 15, the second reaction light emitting unit 15 is configured to emit a second reaction light to the first display region 101, and the light sensitive structure 111 is further configured to adjust the polarizer 11 from the unpolarized state to the polarized state under the action of the second reaction light.

In a process that $I_2$ molecules react with $I^-$ ions to generate $I_3^-$ ions and $I_5^-$ ions, a spontaneous forward reaction typically completes equilibrium within half an hour, and during the process, the display device can perform display. Since the forward reaction is an endothermic reaction, in order to ensure the display effect of the display device, an external thermal excitation source may be supplemented to accelerate the forward reaction. In this embodiment of the present disclosure, the second reaction light emitting unit 15 is provided, and the second reaction light emitting unit 15 emits the second reaction light to the first display region 101 so as to supplement the thermal excitation source to the polarizer in the first display region 101 to accelerate the forward reaction. In this way, $I_2$ molecules react with $I^-$ ions rapidly to generate $I_3^-$ and $I_5^-$ ions such that the light sensitive structure 111 enables the polarizer 11 to be adjusted from the unpolarized state to the polarized state quickly under the action of the second reaction light, thereby ensuring the image display effect.

The second reaction light emitting unit 15 may be disposed adjacent to the first reaction light emitting unit 13. In an embodiment, as shown in FIG. 5, the second reaction light emitting unit 15 and the first reaction light emitting unit 13 may be both fixed on the supporting frame 122 adjacent to the flexible printed circuit (FPC) 14 and electrically connected to the flexible printed circuit through a trace, and the opening and closing of the first reaction light emitting unit 13 and the second reaction light emitting unit 15 are both controlled by the flexible printed circuit. After the imaging module 12 finishes camera shooting, the flexible printed circuit controls the second reaction light emitting unit 15 to work, such that the polarizer 11 quickly returns to the polarized state, thereby ensuring the image display effect.

The first reaction light emitting unit 13 and the second reaction light emitting unit 15 may be controlled by one flexible printed circuit, or may be controlled by two flexible printed circuits, respectively. The number of second reaction light emitting units 15 and the positions of the second reaction light emitting units 15 may also be arranged according to actual requirements, and FIG. 5 only describes two second reaction light emitting units 15 being disposed on the supporting frame 122 and both the first reaction light emitting unit 13 and the second reaction light emitting unit 15 being controlled by one flexible printed circuit as an example, which is not limited in the embodiments of the present disclosure.

In an embodiment, the light sensitive structure 111 includes iodine particles 1111, the first reaction light includes a blue-green laser, and the second reaction light includes an infrared laser.

In an embodiment, when a function of the imaging module 12 is enabled, the flexible printed circuit preferentially controls the first reaction light emitting unit 13 to be opened such that the first reaction light emitting unit 13 emits the blue-green laser to the first display region 101. The blue-green laser can facilitate $I_3^-$ ions and $I_5^-$ ions in the polarizer 11 being decomposed into $I_2$ molecules and $I^-$ ions, thus achieving an anti-reflection function of the polarizer 11 in the first display region 101. After the anti-reflection effect of the first display region 101 is achieved, the first reaction light emitting unit 13 may be closed by the flexible printed circuit, and the imaging module 12 returns to a normal working state of camera shooting to complete the camera shooting, thereby preventing the blue-green laser from influencing the imaging effect of the imaging module 12.

A spontaneous forward reaction typically completes equilibrium within half an hour, and in the process of forward reaction, the display device can perform display. Since the forward reaction is an endothermic reaction, in order to ensure the display effect of the display device, an external thermal excitation source may be supplemented to accelerate the forward reaction. The second reaction light includes the infrared laser. After the imaging module 12 completes the camera shooting, the flexible printed circuit controls the second reaction light emitting unit 15 to emit the infrared laser to the first display region 101. In accordance with the principle of infrared laser heating and the characteristic of the polarizer 11 that the iodine particles 1111 in the polarizer 11 are more likely to absorb infrared laser than other materials in the display device so as to generate peripheral electrons transition without changing a molecular structure, the temperature of the microscopic ambient is increased and the atomic activity is increased, thereby accelerating the forward reaction. In this way, $I_2$ molecules react with $I^-$ ions rapidly to generate $I_3^-$ ions and $I_5^-$ ions such that the iodine particles 1111 enable the polarizer 11 to be adjusted from the unpolarized state to the polarized state quickly under the action of the second reaction light, thereby ensuring the image display effect. The blue-green laser and the infrared laser only serve as an excitation laser and do not damage the structure of the polarizer 11 itself. In addition, the blue-green laser and the infrared laser have little interference to human eyes so that safety requirements are satisfied.

In other embodiments, light in other wavelength ranges may also be selected according to the material of the light sensitive structure 111, which is not limited in the embodiments of the present disclosure.

It is to be noted that the energy of the blue-green laser and the energy of the infrared laser may be adjusted according to actual requirements. For example, the process that the first reaction light impinges onto the polarizer 11 such that the light sensitive structure 111 adjusts the polarizer 11 from the polarized state to the unpolarized state under the action of the first reaction light is extremely fast, and therefore, the required time can be less than 0.225 seconds by which human eyes can recognize through factory adjustment and setting of the optimal energy of the first reaction light emitting unit 13. The energy of the infrared laser may be adjusted according to a required recovery speed, which is not limited in the embodiments of the present disclosure.

Figure 6:
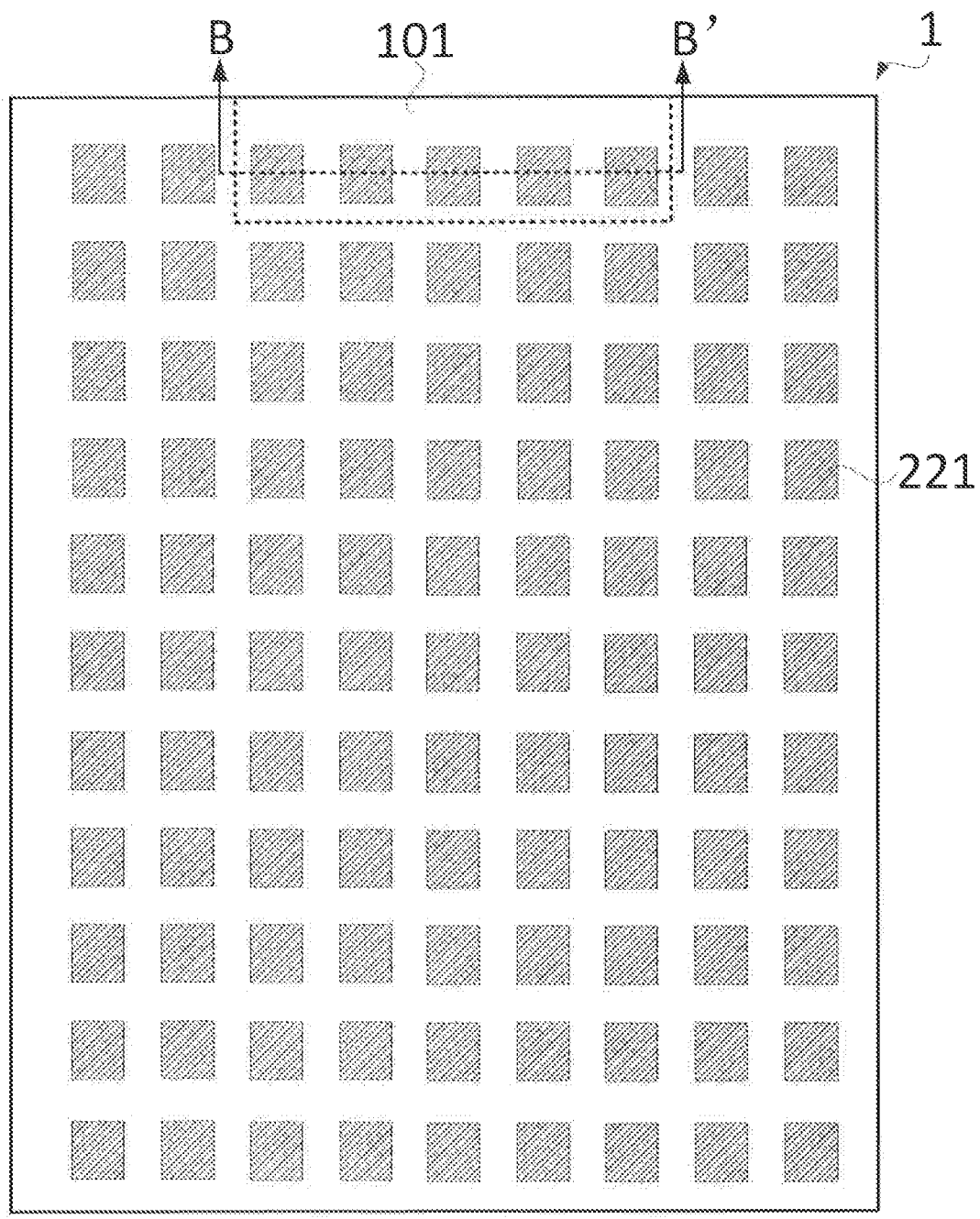
FIG. 6 is a structure view of another display device according to an embodiment of the present disclosure.
Figure 7:
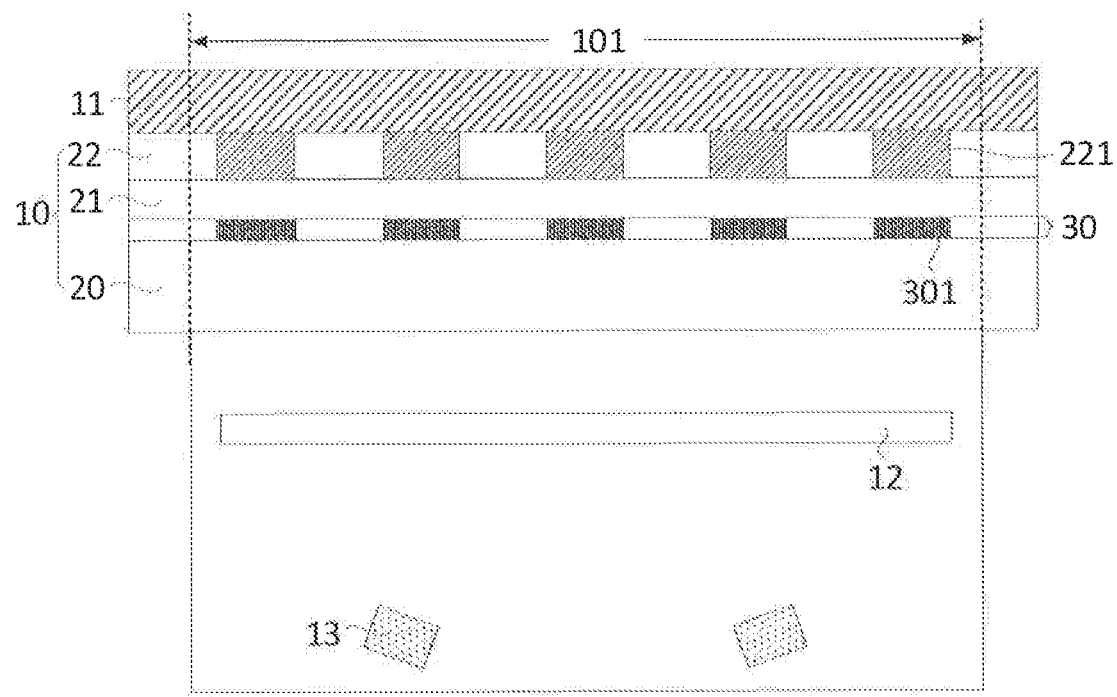
FIG. 7 is a sectional structure view taken along B-B' of FIG. 6.

FIG. 6 is a structure view of another display device according to an embodiment of the present disclosure. FIG. 7 is a sectional structure view taken along B-B' of FIG. 6. As shown in FIG. 6 and FIG. 7, in an embodiment, the display panel 10 includes a substrate 20, a driving circuit layer 21, and a light emitting structure layer 22, and the light emitting structure layer 22 includes a plurality of sub-pixels 221. The display device provided by this embodiment of the present disclosure further includes a light-shielding layer 30, and in the direction perpendicular to the polarizer 11, the light-shielding layer 30 is at least partially overlapped with the first display region 101. The light-shielding layer 30 includes a plurality of first light-shielding sections 301, and in the direction perpendicular to the polarizer 11, the plurality of first light-shielding sections 301 are at least partially overlapped with the plurality of sub-pixels 221.

The substrate 20 may be made of polyimide (PI) or a glass substrate, which may be set by those skilled in the art according to actual requirements. The driving circuit layer 21 is configured to drive the plurality of sub-pixels 221 to emit light, thus achieving the image display.

The first display region 101 is provided with the light-shielding layer 30, and the plurality of first light-shielding sections 301 of the light-shielding layer 30 are at least partially overlapped with the plurality of sub-pixels 221 such that the first reaction light emitted from the first reaction light emitting unit 13 can be prevented from impinging onto the sub-pixels 221, thereby protecting the sub-pixels 221 and ensuring the reliability of the sub-pixels 221.

Figure 8:
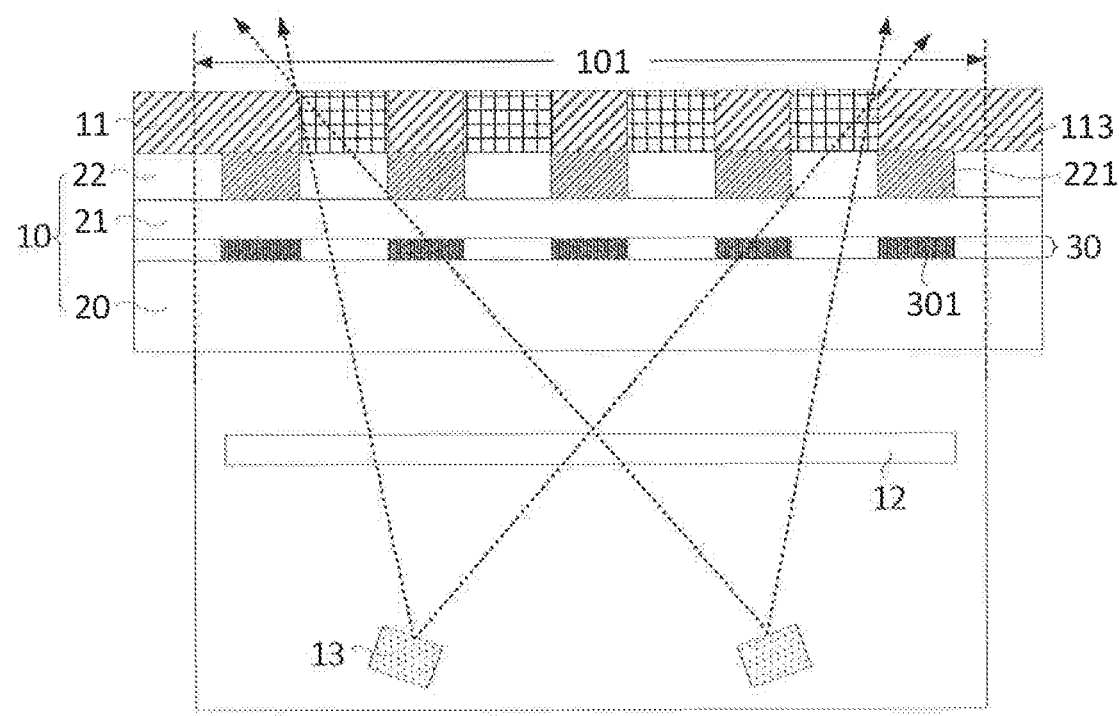
FIG. 8 is a structure view of a display device when a first reaction light emitting unit emits a first reaction light to a first display region according to an embodiment of the present disclosure.

FIG. 8 is a structure view of a display device when a first reaction light emitting unit emits a first reaction light to a first display region according to an embodiment of the present disclosure. As shown in FIG. 8, when the display device performs the camera shooting, the first reaction light emitting unit 13 emits the first reaction light to the first display region 101, the first reaction light impinges onto the polarizer 11 by passing through gaps between two adjacent first light-shielding sections 301, thereby facilitating $I_3^-$ ions and $I_5^-$ ions in the polarizer 11 being decomposed into $I_2$ molecules and $I^-$ ions with varying degrees. In this way, a light transmittance of a local region 113 of the polarizer 11 impinged by the first reaction light is increased, and the external natural light incident on the imaging module 12 is increased, thereby improving the imaging effect of the imaging module 12.

Figure 9:
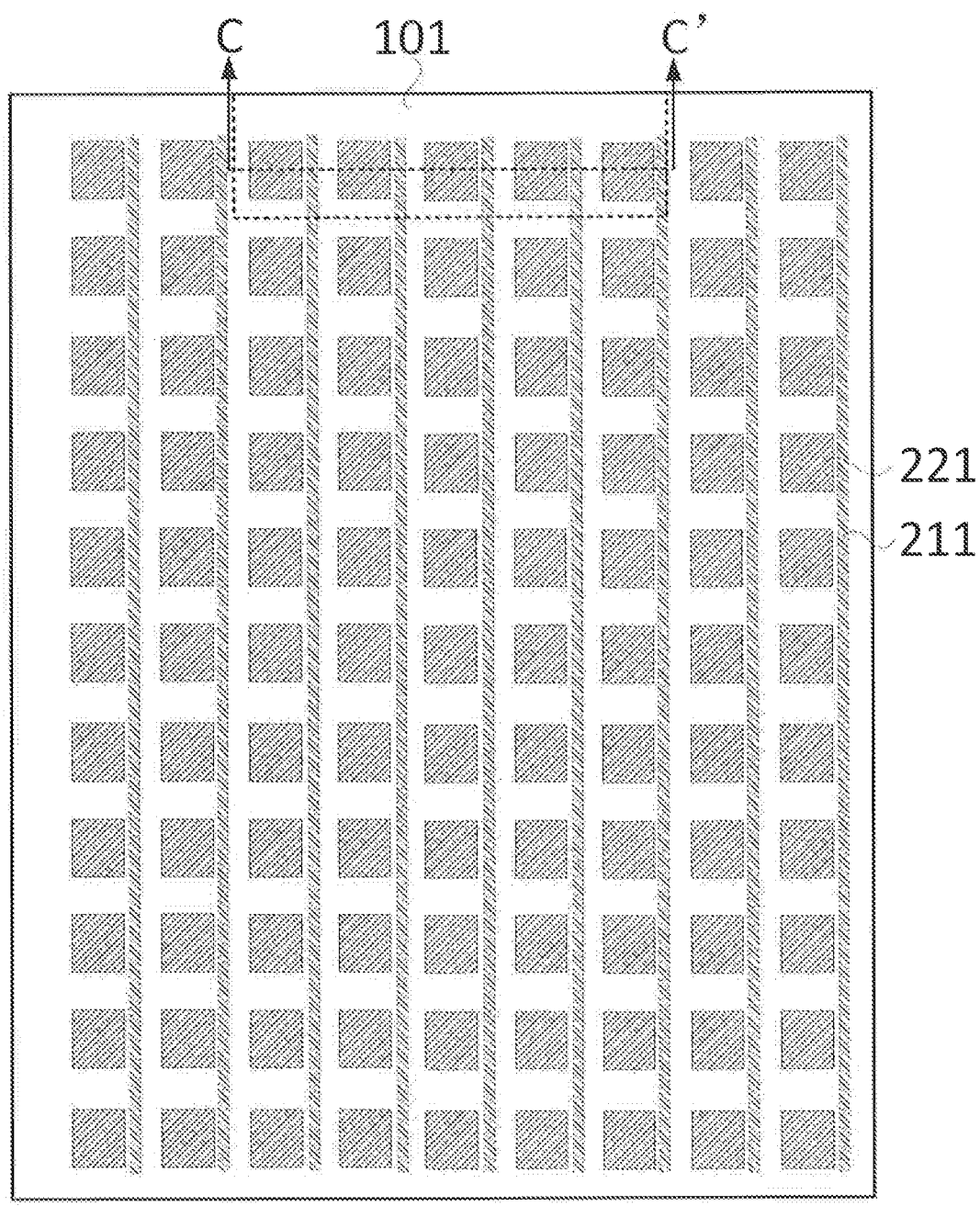
FIG. 9 is a structure view of another display device according to an embodiment of the present disclosure.
Figure 10:
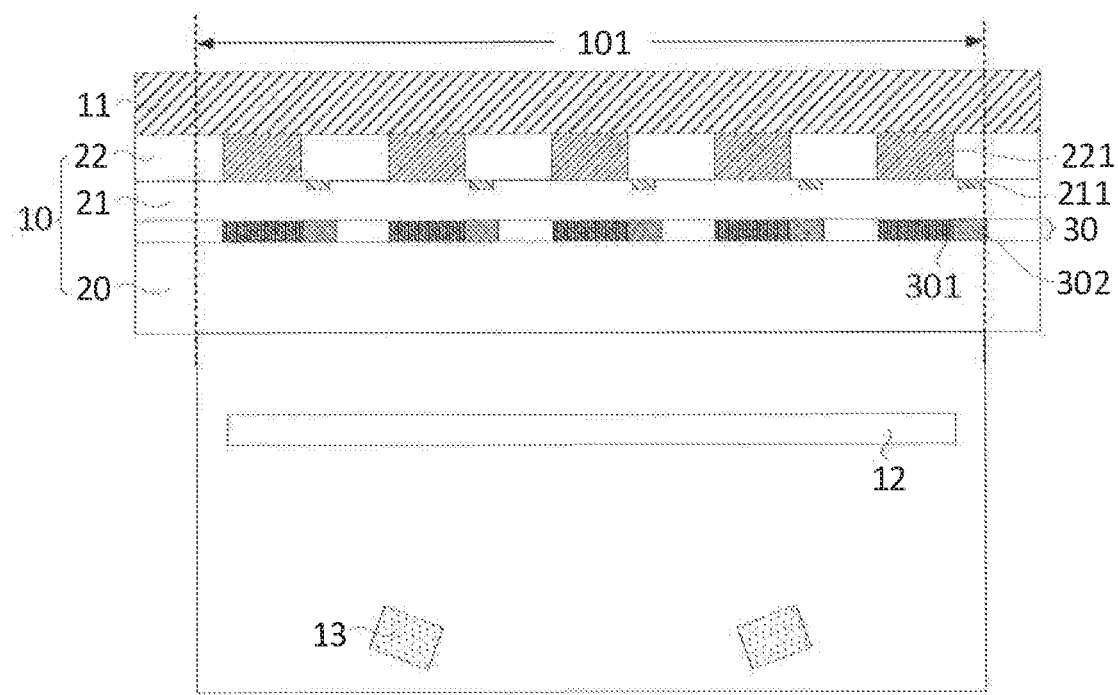
FIG. 10 is a sectional structure view taken along C-C' of FIG. 9.

FIG. 9 is a structure view of another display device according to an embodiment of the present disclosure. FIG. 10 is a sectional structure view taken along C-C' of FIG. 9. In an embodiment, the light-shielding layer 30 further includes a plurality of second light-shielding sections 302, the plurality of second light-shielding sections 302 are connected to the plurality of first light-shielding sections 301 so as to form a plurality of light-shielding chains 31, and the first reaction light is incident on the polarizer 11 by passing through a gap between two adjacent light-shielding chains 31 among the plurality of light-shielding chains; or the plurality of second light-shielding sections 302 are connected to the plurality of first light-shielding sections 301 so as to form a light-shielding grid 32, and the first reaction light is incident on the polarizer 11 by passing through a mesh 321 of the light-shielding grid 32. The driving circuit layer 21 includes a plurality of signal traces 211, and in the direction perpendicular to the polarizer 11, the plurality of second light-shielding sections 302 are at least partially overlapped with the plurality of signal traces 211.

Since gaps exist among the plurality of signal traces 211, the problem of light diffraction is caused due to the existence of the gaps. The existence of the problem of diffraction of light affects the normal imaging function of the imaging module 12, resulting in unclear imaging and affecting the shooting effect. The plurality of second light-shielding sections 302 are at least partially overlapped with the plurality of signal traces 211, such that the first reaction light emitted from the first reaction light emitting unit 13 can be prevented from impinging onto the signal traces 211, thus preventing the diffraction from affecting the normal imaging function of the imaging module 12, and improving the imaging effect.

In other embodiments, the shape and the position of the light-shielding layer 30 may be set according to the position of the sub-pixel 221, the position of the signal trace 211, the patterning design of the cathode and other actual requirements, which is not limited in the embodiments of the present disclosure.

Figure 11:
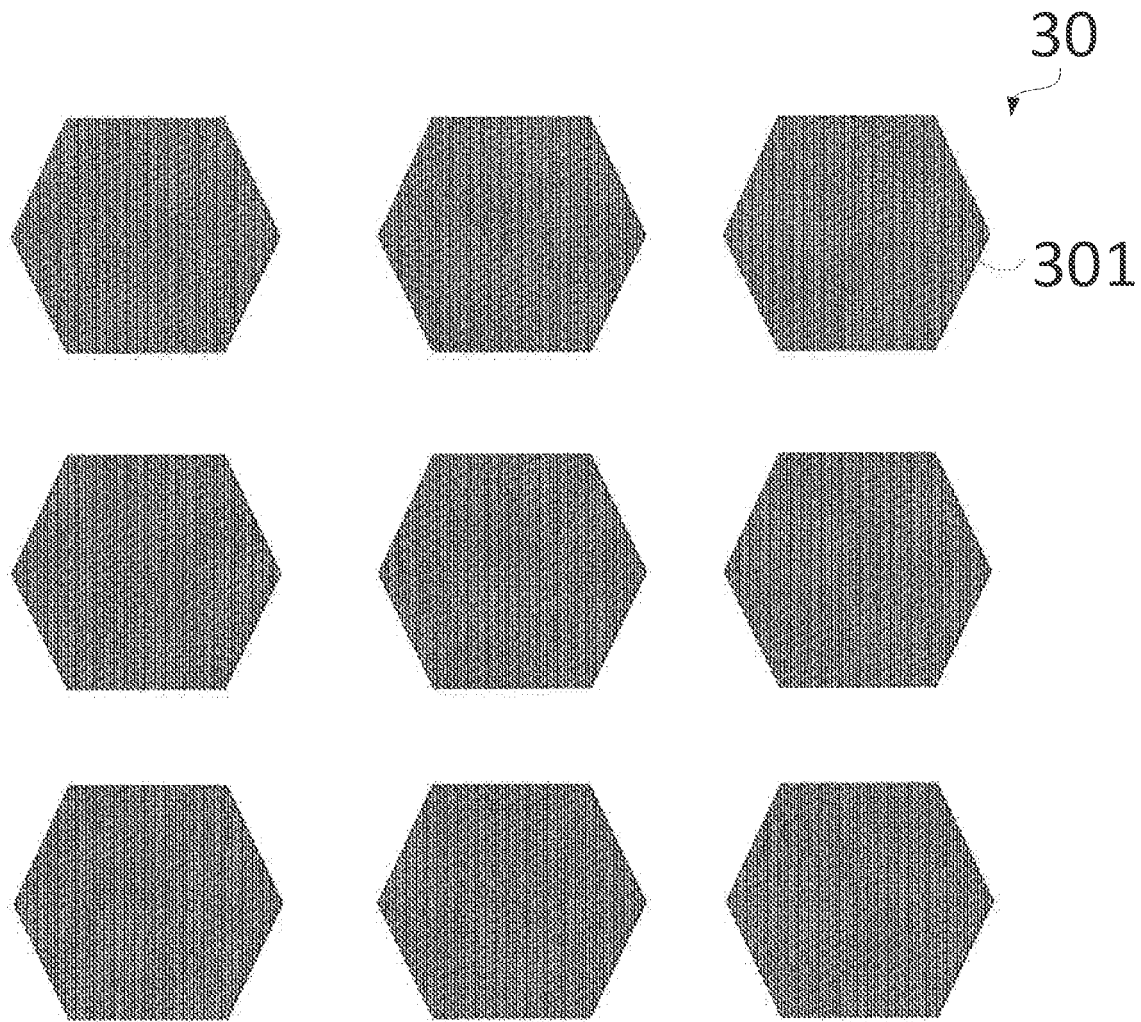
FIG. 11 to FIG. 15 are structure views of a light-shielding layer according to an embodiment of the present disclosure.
Figure 12:
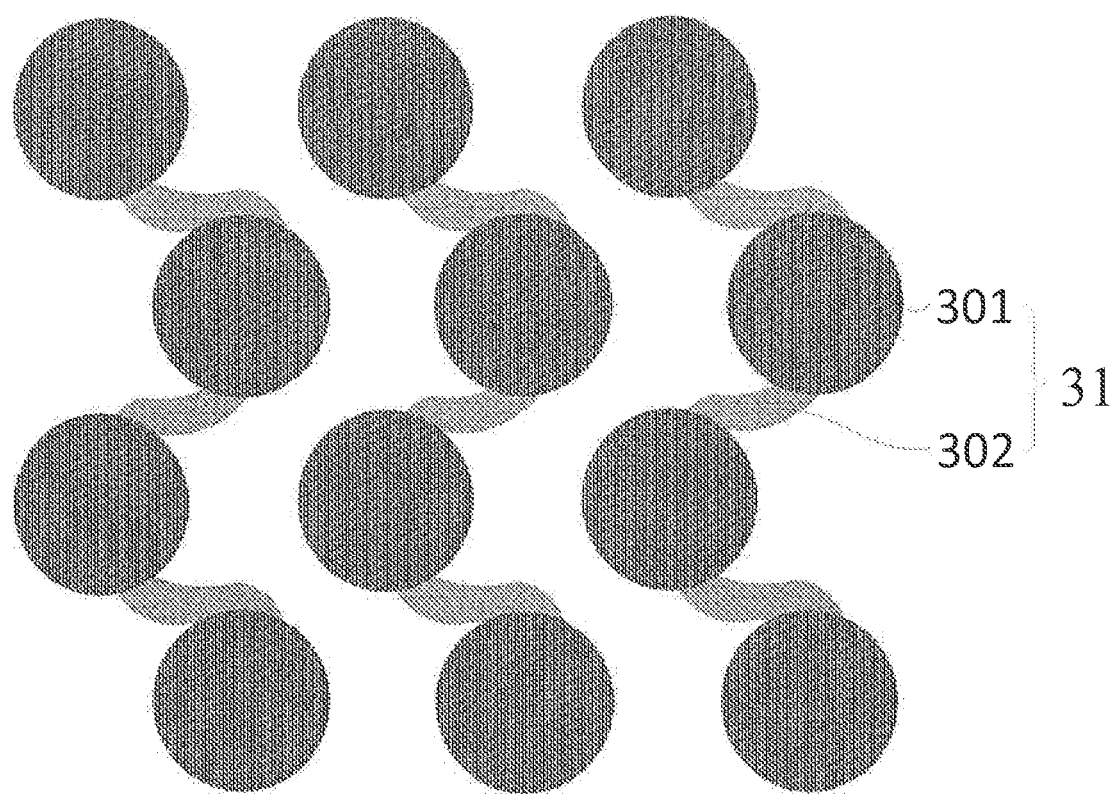
Figure 13:
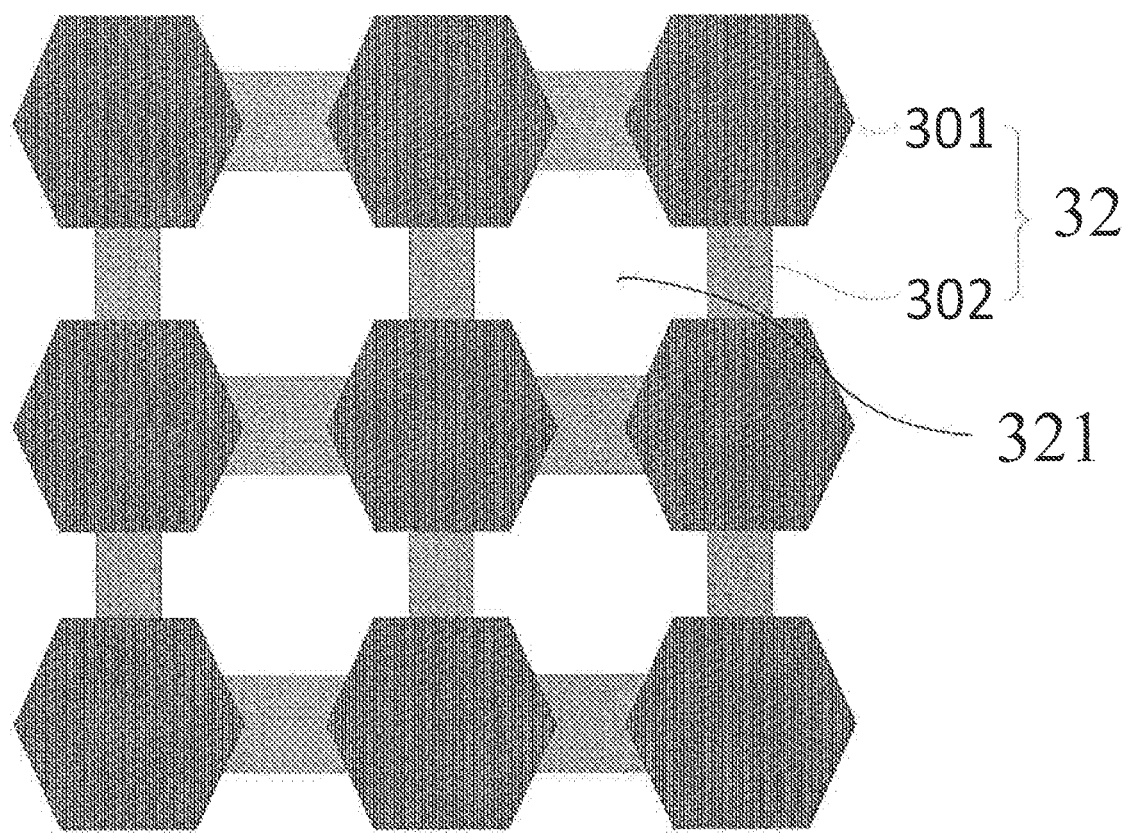
Figure 14:
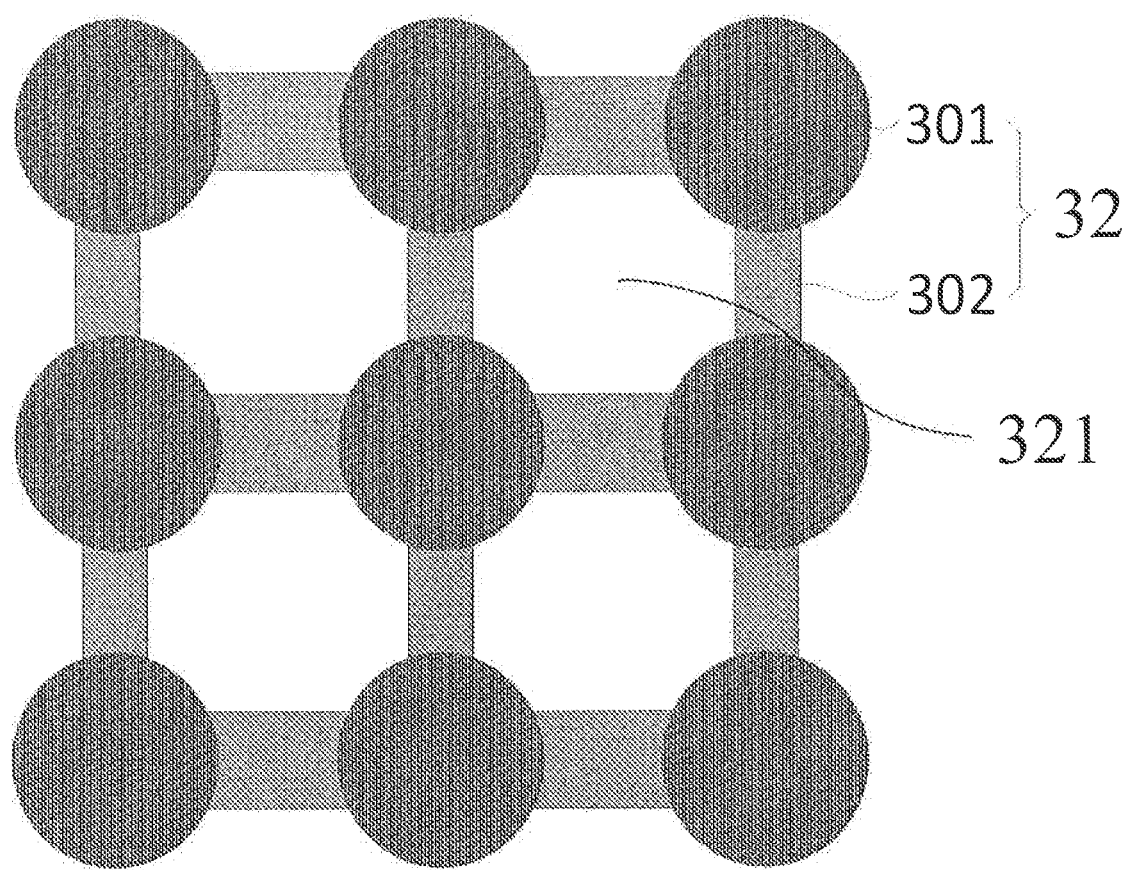
Figure 15:
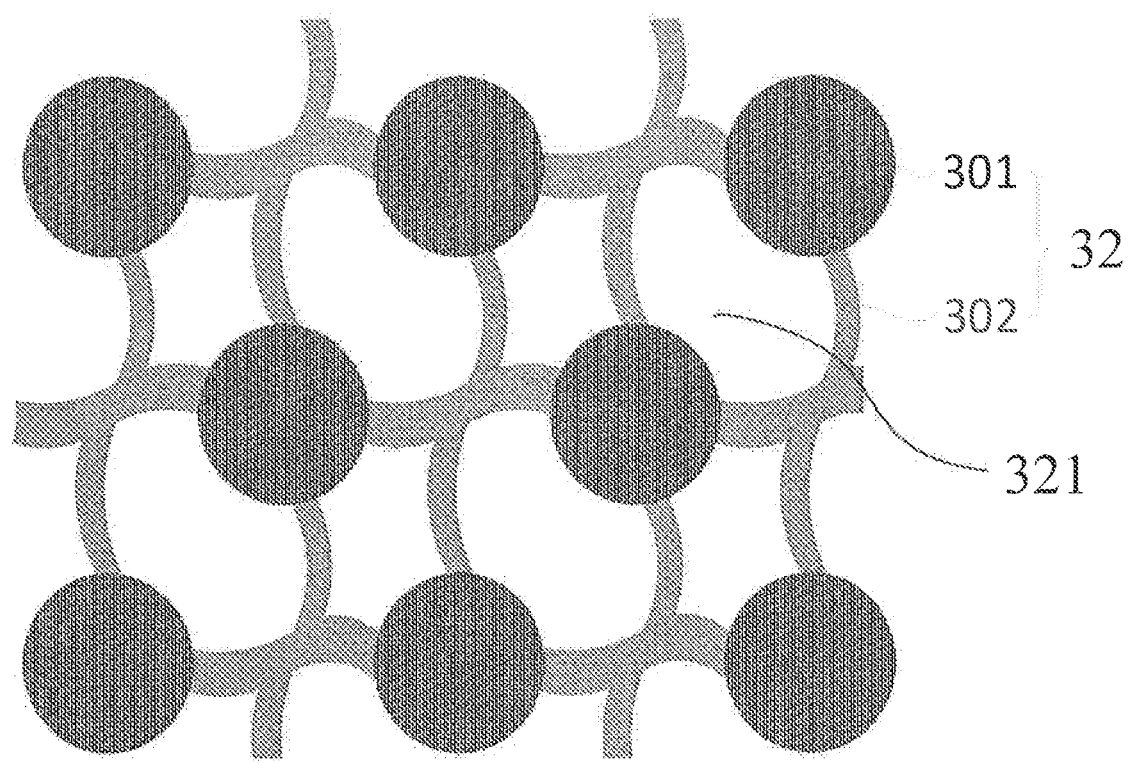

FIG. 11 to FIG. 15 are structure views of a light-shielding layer according to an embodiment of the present disclosure. As shown in FIG. 11 to FIG. 15, In an embodiment, the light-shielding layer 30 may include only first light-shielding sections 301 as shown in FIG. 11. The first light-shielding section 301 may further include a plurality of second light-shielding sections 302, the second light-shielding sections 302 are connected to the first light-shielding sections 301 so as to form a plurality of light-shielding chains 31, and the first reaction light is incident on the polarizer 11 by passing through a gap between two adjacent light-shielding chains 31, as shown in FIG. 12. The second light-shielding sections 302 may further be connected to the first light-shielding sections 301 so as to form a light-shielding grid 32, and the first reaction light is incident on the polarizer 11 by passing through a mesh 321 of the light-shielding grid 32, as shown in FIG. 13 to FIG. 15.

The first light-shielding sections 301 may be in any shape, and those skilled in the art may set the shape of the first light-shielding sections 301 according to the design of the sub-pixels 221. For example, the first light-shielding sections 301 may be set to be circular, hexagonal or the like.

The second light-shielding sections 302 may be in any shape, and those skilled in the art may set the shape of the second light-shielding sections 302 according to the design of the traces. For example, the second light-shielding sections 302 may be arc-shaped or linear, and the shape of the second light-shielding sections 302 is not limited in the embodiments of the present disclosure.

In addition, the first light-shielding sections 301 and the second light-shielding sections 302 may be made of the same material or may be made of different materials. In an embodiment, the first light-shielding sections 301 and the second light-shielding sections 302 being made of the same material is described as an example. The first light-shielding sections 301 and the second light-shielding sections 302 may be disposed in a same layer, such that the arrangement of one metal layer can be reduced, thereby achieving the purpose of reducing production costs and reducing the thickness of the substrate. In addition, the first light-shielding sections 301 and the second light-shielding sections 302 may be prepared in the same processing, thereby shortening the processing time. Those skilled in the art may set the material of the first light-shielding sections 301 and the material of the second light-shielding sections 302 according to actual requirements, which is not limited in the embodiments of the present disclosure.

In the display device provided by the embodiments of the present disclosure, the light-shielding layer 30 is patterned such that the first reaction light emitted from the first reaction light emitting unit 13 can be prevented from impinging onto the sub-pixels 221. In this way, the polarizer 11 at the sub-pixel 221 can normally achieve the polarization function, and the sub-pixel 221 is ensured to have no color cast during display. The first reaction light may impinge onto the polarizer 11 through gaps between adjacent light-shielding chains 31 or the mesh 321 of the light-shielding grid 32, such that a light transmittance of a local region 113 of the polarizer 11 impinged by the first reaction light is increased, and the external natural light incident on the imaging module 12 is increased, thereby improving the imaging effect of the imaging module 12.

In an embodiment, the light-shielding layer 30 includes a metal light-shielding layer.

The light-shielding layer 30 adopts the metal light-shielding layer, such that the first reaction light and the second reaction light can be reflected by the metal light-shielding layer, thereby facilitating the improvement of the utilization rate of the first reaction light and the second reaction light.

In other embodiments, the light-shielding layer 30 may also adopt a light-absorbing layer, as well as any other light-shielding material that is insensitive to the first reaction light and the second reaction light, such as molybdenum, silver or the like. The material of the light-shielding layer 30 may be set according to actual requirements by those skilled in the art and is not limited in the embodiments of the present disclosure.

Figure 16:
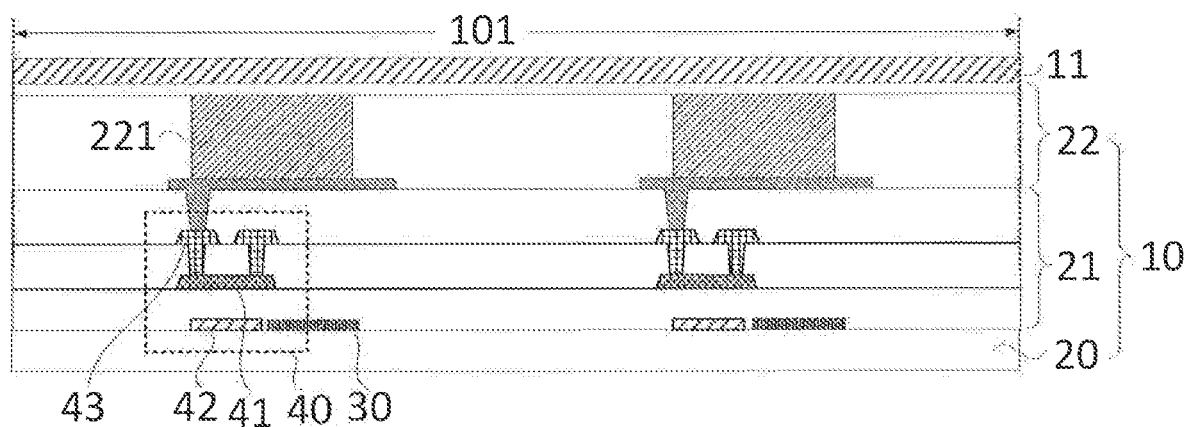
FIG. 16 is a partial structure view of a first display region of a display panel according to an embodiment of the present disclosure.

FIG. 16 is a partial structure view of a first display region of a display panel according to an embodiment of the present disclosure. As shown in FIG. 16, in an embodiment, the light-shielding layer 30 is disposed on one side of the substrate 20 facing towards the driving circuit layer 21. The driving circuit layer 21 includes a plurality of driving circuits, and each of the plurality of driving circuits includes a transistor 40. The transistor 40 includes an active layer 41 and a gate 42, the gate 42 is disposed on one side of the active layer 41 facing towards the substrate 20, and gate 42 and the light-shielding layer 30 are disposed in a same layer.

As shown in FIG. 16, the driving circuit layer 21 includes a plurality of driving circuits, and the plurality of driving circuits are electrically connected to the sub-pixels 221 so as to drive the sub-pixels 221 to emit light, thereby achieving the image display. The driving circuit includes the transistor 40, and the transistor 40 includes the active layer 41, the gate 42 and a source-drain electrode layer 43. The transistor 40 has a bottom-gate structure, that is, the gate 42 is disposed on the one side of the active layer 41 facing towards the substrate 20. The light-shielding layer 30 and the gate 42 are disposed in the same layer, such that the sub-pixels 221 are protected and the arrangement of one metal layer can be reduced at the same time, thereby achieving the purpose of reducing production costs and reducing the thickness of the substrate. In addition, the light-shielding layer 30 and the gate 42 may be made of the same material, and the light-shielding layer 30 and the gate 42 may be prepared in the same processing, thereby shortening the processing time.

Figure 17:
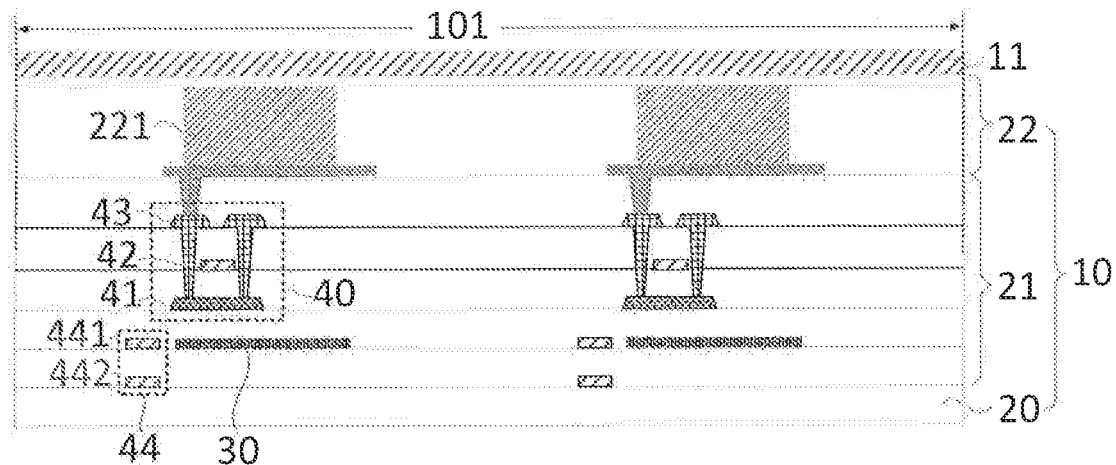
FIG. 17 is a partial structure view of a first display region of another display panel according to an embodiment of the present disclosure.
Figure 18:
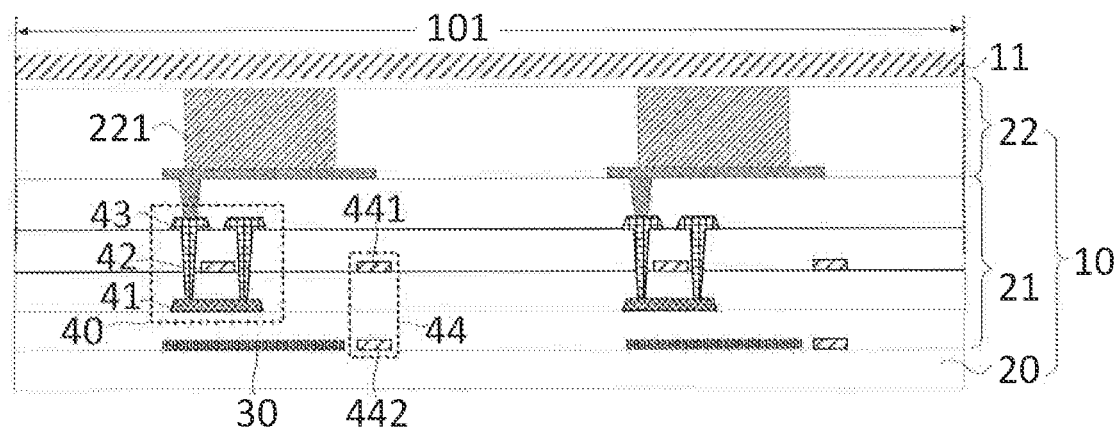
FIG. 18 is a partial structure view of a first display region of another display panel according to an embodiment of the present disclosure.

FIG. 17 is a partial structure view of a first display region of another display panel according to an embodiment of the present disclosure. FIG. 18 is a partial structure view of a first display region of another display panel according to an embodiment of the present disclosure. As shown in FIG. 17 and FIG. 18, in an embodiment, the light-shielding layer 30 is disposed on one side of the substrate 20 facing towards the driving circuit layer 21, the driving circuit layer 21 includes a plurality of driving circuits, each of the plurality of driving circuits includes a capacitive structure 44, and the capacitive structure 44 includes a first capacitor plate 441 and a second capacitor plate 442; and the first capacitor plate 441 and the light-shielding layer 30 are disposed in a same layer or the second capacitor plate 442 and the light-shielding layer 30 are disposed in a same layer.

In an embodiment, as shown in FIG. 17 and FIG. 18, the driving circuit may include the capacitive structure 44, the capacitive structure 44 includes the first capacitor plate 441 and the second capacitor plate 442, and the light-shielding layer 30 and the first capacitor plate 441 are disposed in the same layer (as shown in FIG. 17) or the light-shielding layer 30 and the second capacitor plate 442 are disposed in the same layer (as shown in FIG. 18). In this way, the sub-pixels 221 are protected and the arrangement of one metal layer can be reduced at the same time, thereby achieving the purpose of reducing production costs and reducing the thickness of the substrate. In addition, the light-shielding layer 30 and the first capacitor plate 441 or the second capacitor plate 442 may be made of the same material, and the light-shielding layer 30 and the first capacitor plate 441 or the second capacitor plate 442 may be prepared in the same processing, thereby shortening the processing time.

Figure 19:
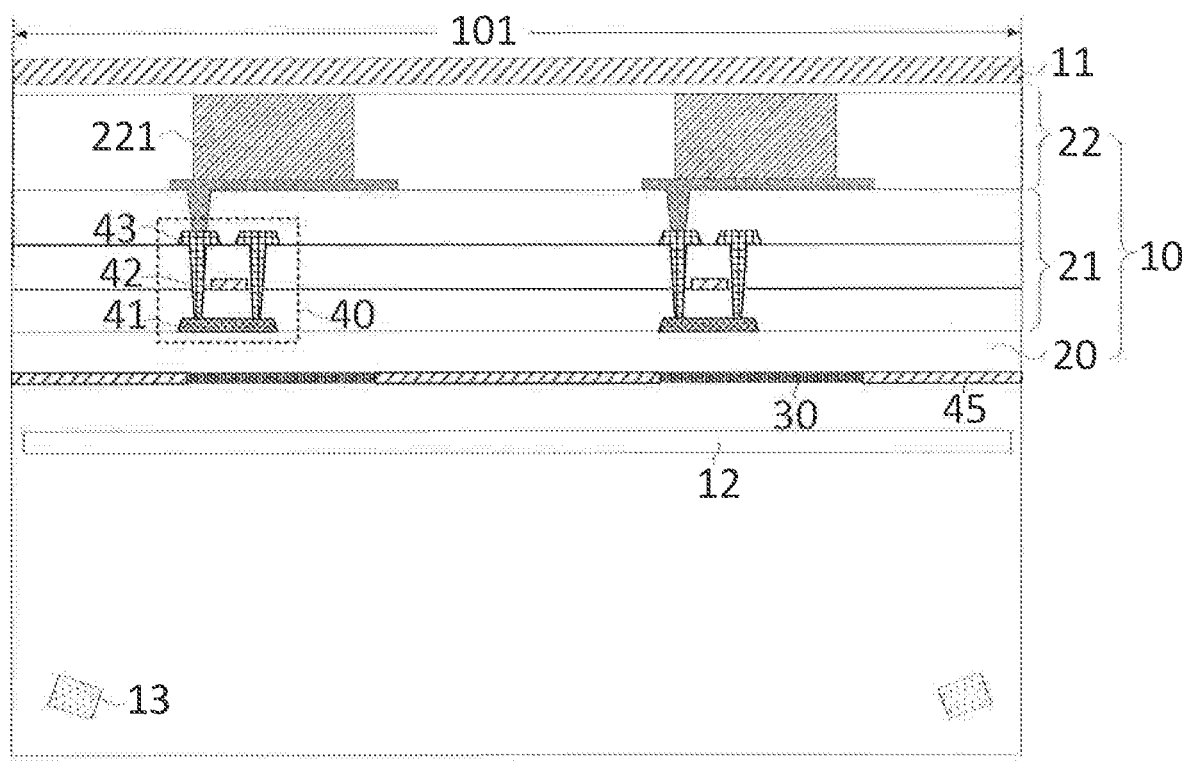
FIG. 19 is a partial structure view of a first display region of a display device according to an embodiment of the present disclosure.

FIG. 19 is a partial structure view of a first display region of a display device according to an embodiment of the present disclosure. As shown in FIG. 19, in an embodiment, the light-shielding layer 30 is disposed on one side of the substrate 20 facing away from the driving circuit layer 21. The display device provided by this embodiment of the present disclosure further includes a conductive metal layer 45, and the conductive metal layer 45 and the metal light-shielding layer 45 are disposed in a same layer.

In an embodiment, as shown in FIG. 19, the display device further includes the conductive metal layer 45, the conductive metal layer 45 is disposed on the one side of the substrate 20 facing away from the driving circuit layer, and the conductive metal layer 45 may be configured to conduct heat, conduct static electricity, or act as the shield, thereby ensuring the reliability of the display device. The conductive metal layer 45 may be made of a copper foil or other metal materials, which may be set by those skilled in the art according to actual requirements.

As shown in FIG. 19, the light-shielding layer 30 and the conductive metal layer 45 are disposed in the same layer, such that the sub-pixels 221 are protected and the arrangement of one metal layer can be reduced at the same time, thereby achieving the purpose of reducing production costs and reducing the thickness of the substrate. In addition, the light-shielding layer 30 and the conductive metal layer 45 may be made of the same material such that the light-shielding layer 30 and the conductive metal layer 45 may be prepared in the same processing, thereby shortening the processing time.

Figure 20:
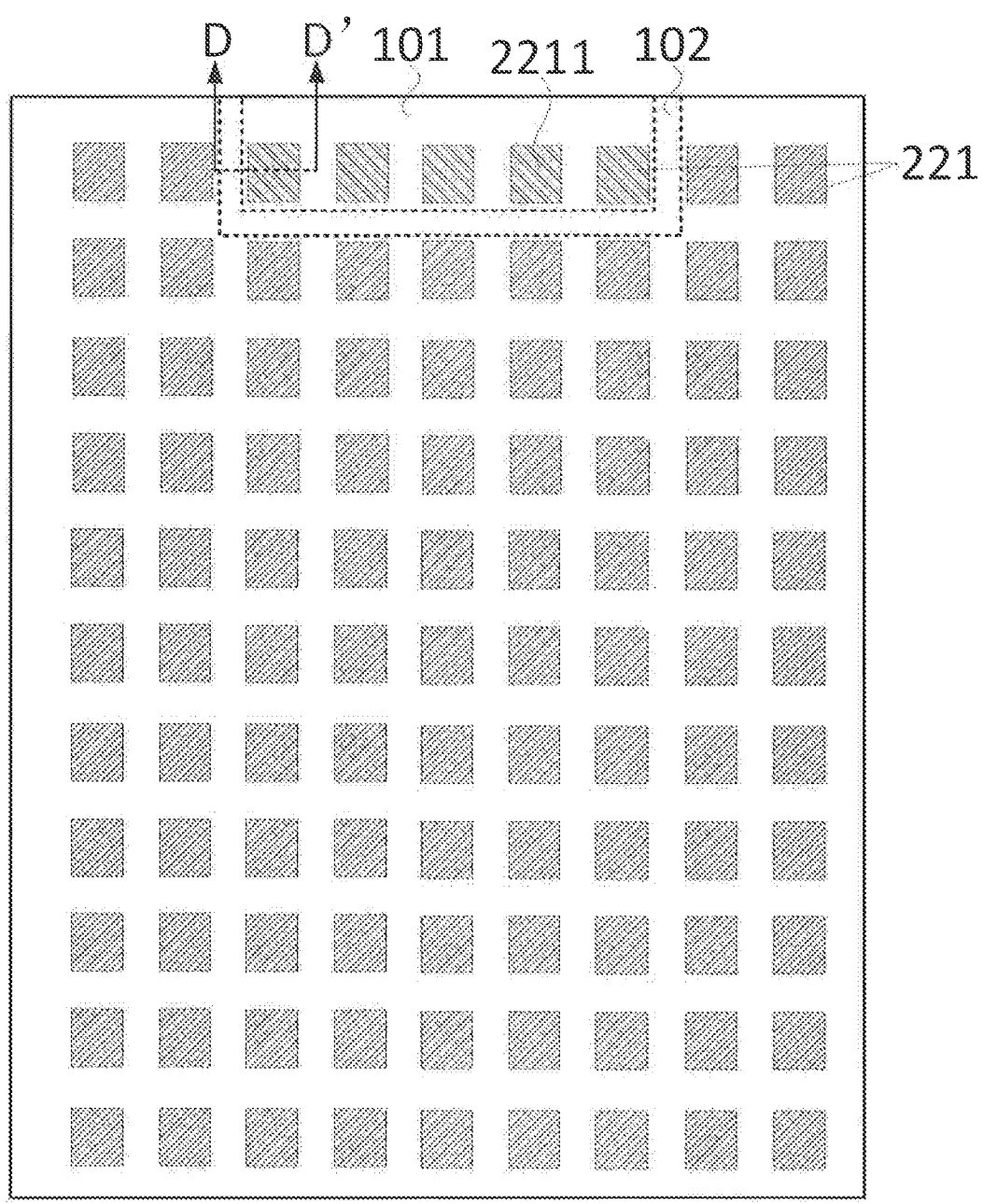
FIG. 20 is a structure view of another display device according to an embodiment of the present disclosure.
Figure 21:
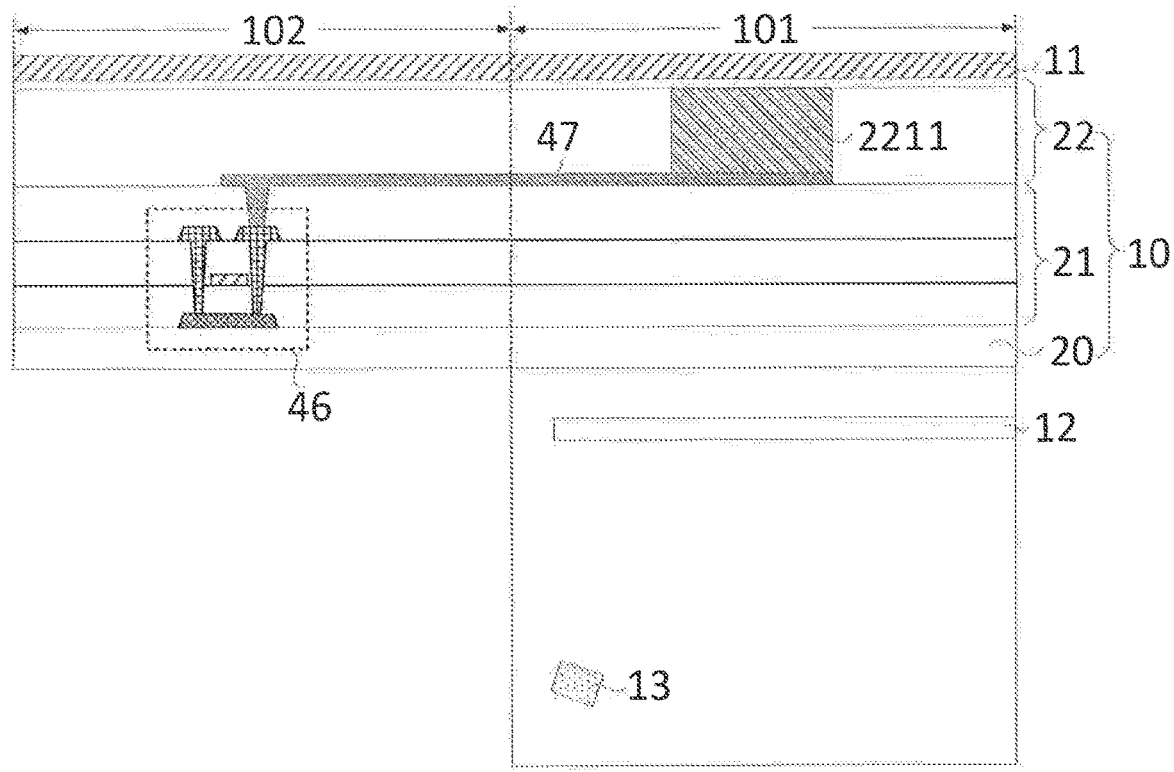
FIG. 21 is a sectional structure view taken along D-D' of FIG. 20.

FIG. 20 is a structure view of another display device according to an embodiment of the present disclosure. FIG. 21 is a sectional structure view taken along D-D' of FIG. 20. As shown in FIG. 20 and FIG. 21, in an embodiment, the display panel 10 includes a substrate 20, a driving circuit layer 21 and a light emitting structure layer 22, the driving circuit layer 21 includes a plurality of driving circuits, the light emitting structure layer 22 includes a plurality of sub-pixels 221, the plurality of sub-pixels 221 include a first sub-pixel 2211 disposed in the first display region 101, the plurality of driving circuits include a first driving circuit 46, and the first driving circuit 46 is configured to drive the first sub-pixel 2211 to emit light. The display panel 10 further includes a transition display region 102, and the first driving circuit 46 is disposed in the transition display region 102. The first driving circuit 46 is electrically connected to the first sub-pixel 2211 through a connection trace 47, and the connection trace 47 disposed in the first display region 101 includes a transparent trace.

In an embodiment, as shown in FIG. 20 and FIG. 21, the first driving circuit 46 is electrically connected to the first sub-pixel 2211 through the connection trace 47 so as to drive the first sub-pixel 2211, thus achieving the display function of the first display region 101. The first driving circuit 46 is disposed in the transition display region 102 adjacent to the first display region 101 so as to prevent the first driving circuit 46 from blocking the first display region 101. In this way, the light transmittance of the first display region 101 is increased, and the external natural light incident on the imaging module 12 is increased, thereby improving the imaging effect of the imaging module 12.

In addition, the connection trace 47 disposed in the first display region 101 is set as a transparent trace such that the connection trace 47 can be prevented from blocking the first display region 101, thereby further improving the light transmittance of the first display region 101 and improving the imaging effect of the imaging module 12.

Figure 22:
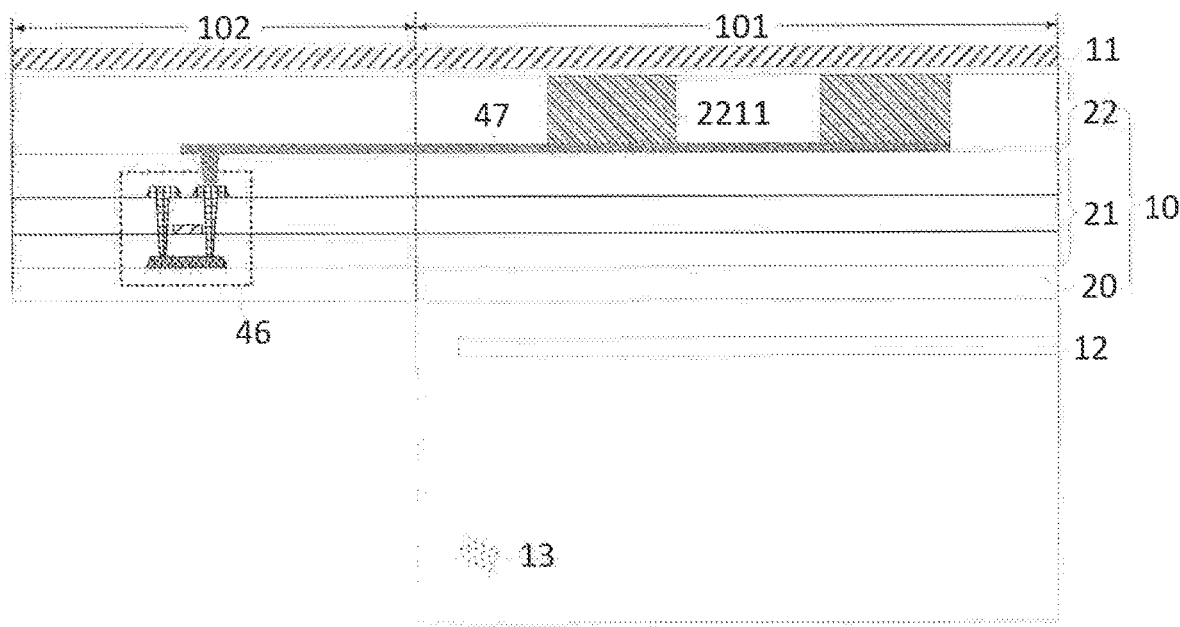
FIG. 22 is a partial structure view of a display panel according to an embodiment of the present disclosure.

FIG. 22 is a partial structure view of a display panel according to an embodiment of the present disclosure. As shown in FIG. 22, at least two first sub-pixels 2211 may be driven by one first driving circuit 46 such that the number of first driving circuits 46 is reduced, thereby reducing the area of the transition display region 102 occupied by the first driving circuit 46, and facilitating the improvement the display effect.

In an embodiment, as shown in FIG. 22, one first driving circuit 46 driving two first sub-pixels 2211 is described as an example. One first driving circuit 46 is connected to two first sub-pixels 2211 through the connection trace 47, such that one first driving circuit 46 drives two first sub-pixels 2211 to perform display. In this way, the number of first driving circuits 46 is halved, and the occupied area of the first driving circuits 46 is reduced by half, so that the area of the transition display region can be reduced by half, thereby facilitating the improvement of the display effect.

Figure 23:
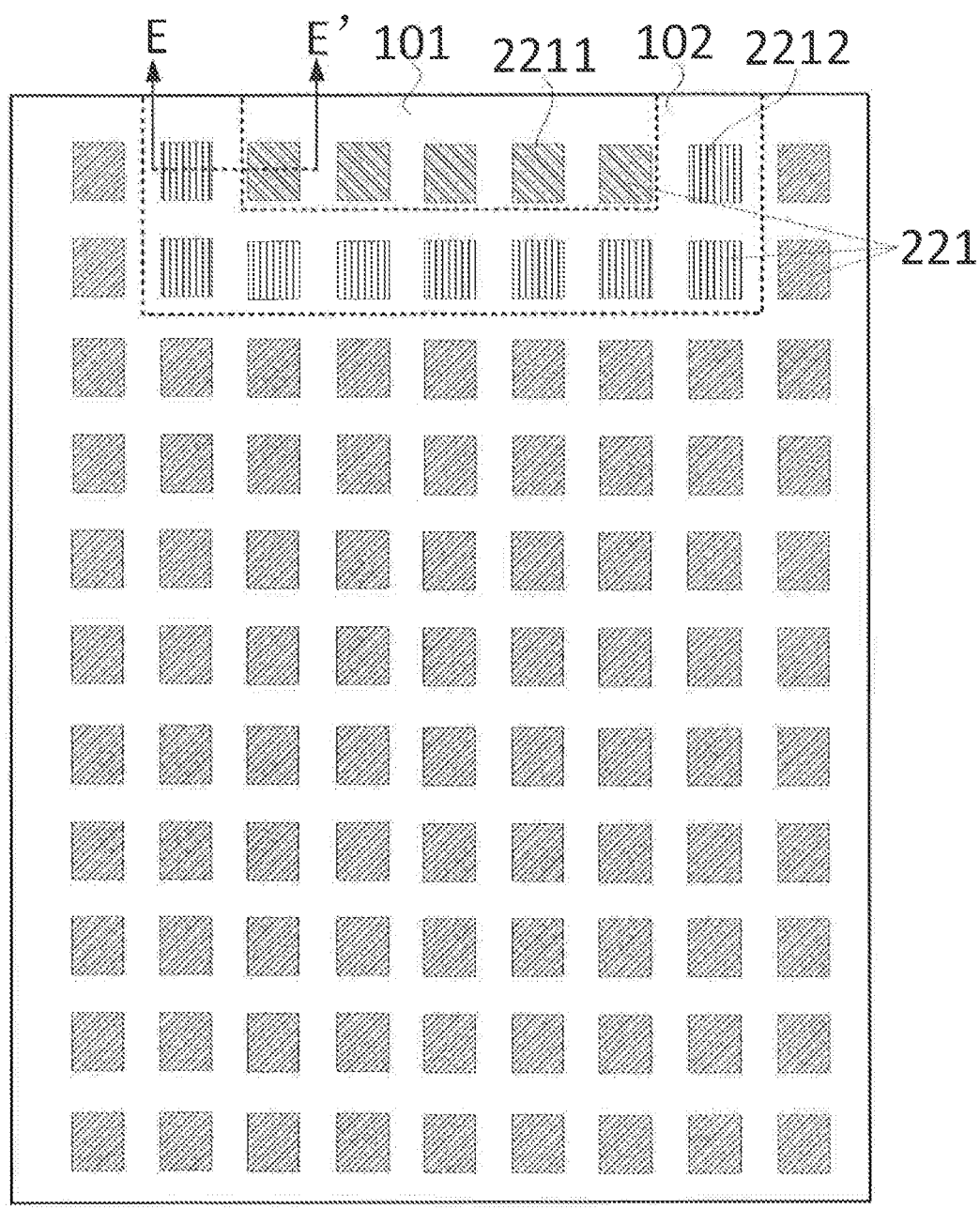
FIG. 23 is a structure view of another display device according to an embodiment of the present disclosure.
Figure 24:
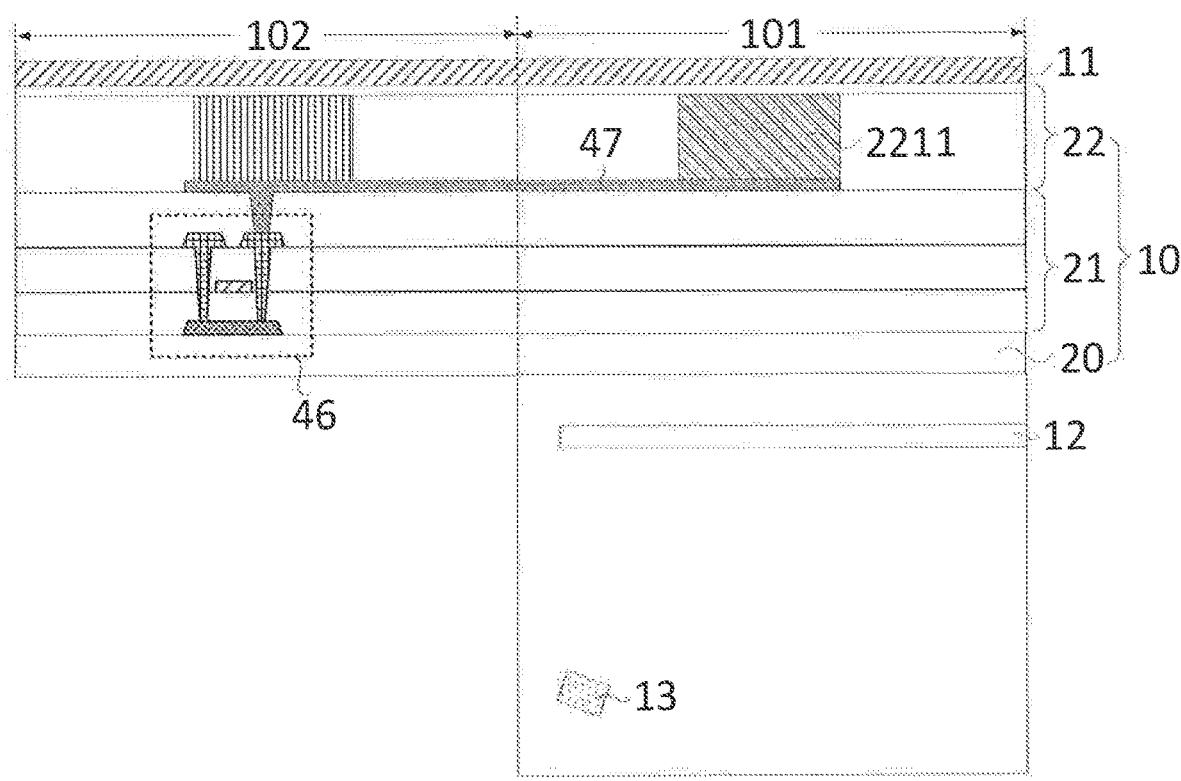
FIG. 24 is a sectional structure view taken along E-E' of FIG. 23.

FIG. 23 is a structure view of another display device according to an embodiment of the present disclosure. FIG. 24 is a sectional structure view taken along E-E' of FIG. 23. As shown in FIG. 23 and FIG. 24, in an embodiment, the display panel 10 further includes a transition display region 102, the light emitting structure layer 22 includes a plurality of sub-pixels 221, and the plurality of sub-pixels 221 include a first sub-pixel 2211 disposed in the first display region 101, and further include a plurality of transition sub-pixels 2212 disposed in the transition display region 102. The plurality of driving circuits include a first driving circuit 46, and the first driving circuit 46 is configured to drive the first sub-pixel 2211 and the transition sub-pixel 2212 to emit light. The first driving circuit 46 is disposed in the transition display region 102, the first driving circuit 46 is electrically connected to the first sub-pixel 2211 and the transition sub-pixel 2212 through a connection trace 47, and the connection trace 47 disposed in the first display region 101 includes a transparent trace.

In an embodiment, as shown in FIG. 23 and FIG. 24, the first driving circuit 46 is electrically connected to the first sub-pixel 2211 and the transition sub-pixel 2212 through the connection trace 47, so as to drive the first sub-pixel 2211 and the transition sub-pixel 2212 to emit light. In this way, the display function of the first display region 101 and the display function of the transition display region 102 are achieved. The first driving circuit 46 is disposed in the transition display region 102 adjacent to the first display region 101 so as to prevent the first driving circuit 46 from blocking the first display region 101. In this way, the light transmittance of the first display region 101 is increased, and the external natural light incident on the imaging module 12 is increased, thereby improving the imaging effect of the imaging module 12.

In addition, the connection trace 47 disposed in the first display region 101 is set as a transparent trace such that the connection trace 47 can be prevented from blocking the first display region 101, thereby further improving the light transmittance of the first display region 101 and improving the imaging effect of the imaging module 12.

Figure 25:
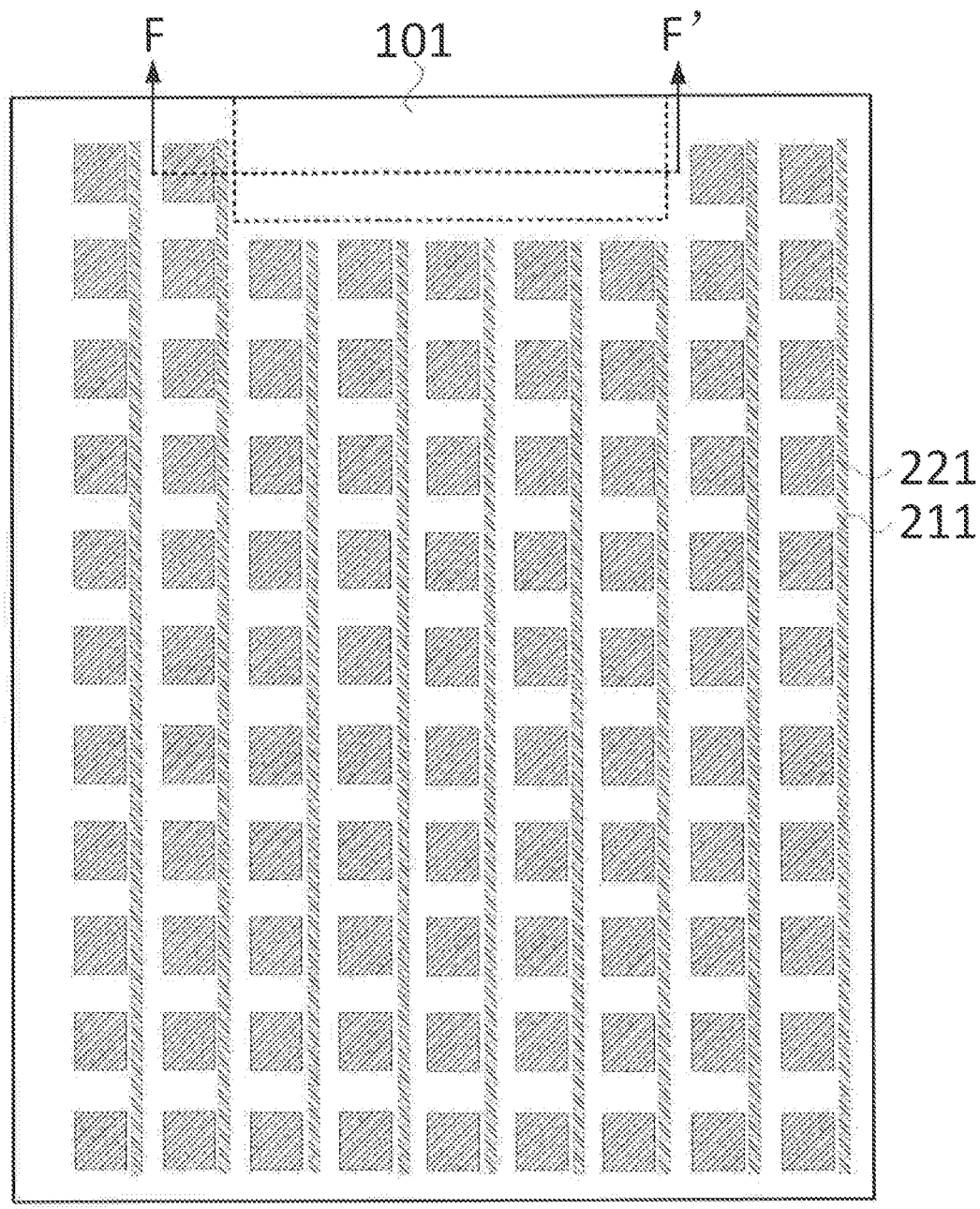
FIG. 25 is a structure view of another display device according to an embodiment of the present disclosure.
Figure 26:
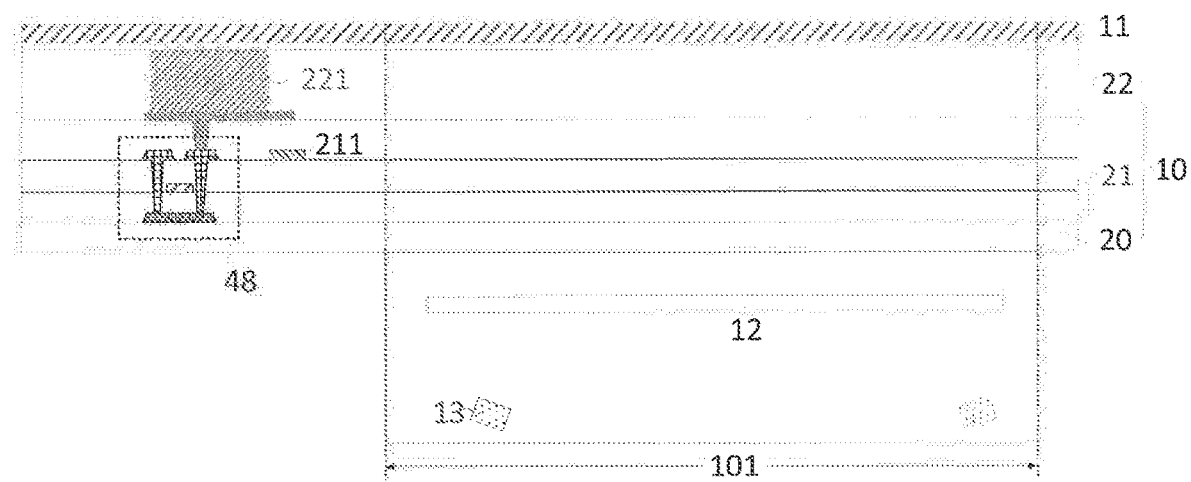
FIG. 26 is a sectional structure view taken along F-F' of FIG. 25.

FIG. 25 is a structure view of another display device according to an embodiment of the present disclosure. FIG. 26 is a sectional structure view taken along F-F of FIG. 25. As shown in FIG. 25 and FIG. 26, in an embodiment, the display panel 10 includes a substrate 20, a driving circuit layer 21 and a light emitting structure layer 22, the driving circuit layer 21 includes a plurality of driving circuits 48 and a plurality of signal traces 211, and the light emitting structure layer 22 includes a plurality of sub-pixels 221. In the direction perpendicular to the polarizer 11, the plurality of driving circuits 48, the plurality of signal traces 211 and the plurality of sub-pixels 221 do not overlap with the first display region 101.

As shown in FIG. 25 and FIG. 26, the driving circuit 48, the signal trace 211 and the sub-pixel 221 are all disposed outside the first display region 101, such that the driving circuit 48, the signal trace 211 and the sub-pixel 221 can be prevented from blocking the first display region 101. In this way, the light transmittance of the first display region 101 is increased, and the external natural light incident on the imaging module 12 is increased, thereby improving the imaging effect of the imaging module 12.

Figure 27:
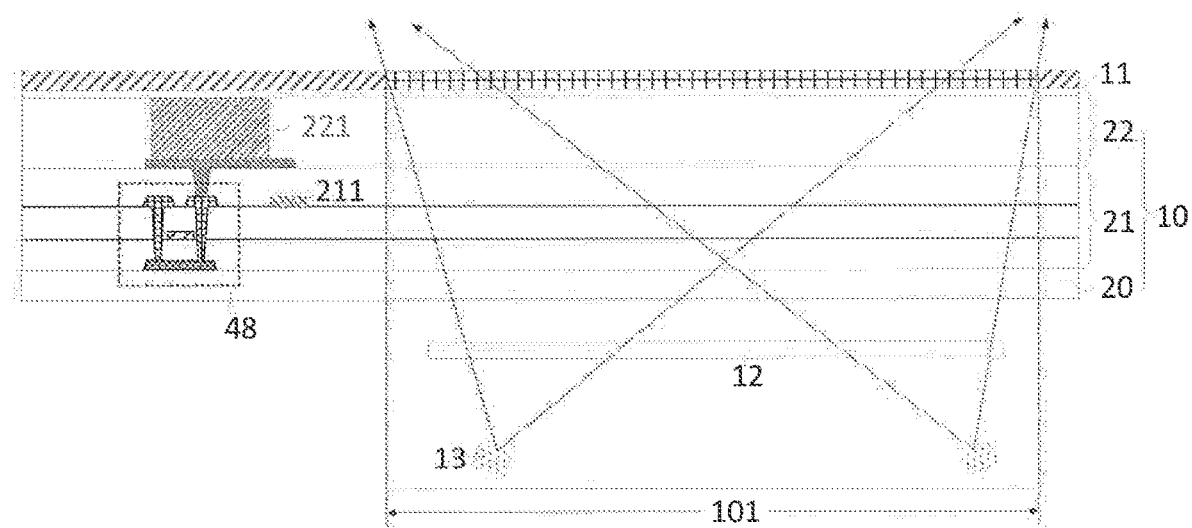
FIG. 27 is a structure view of another display device when a first reaction light emitting unit emits a first reaction light to a first display region according to an embodiment of the present disclosure.

FIG. 27 is a structure view of another display device when a first reaction light emitting unit emits a first reaction light to a first display region according to an embodiment of the present disclosure. As shown in FIG. 27, when the display device performs the camera shooting, the first reaction light emitting unit 13 emits the first reaction light to the first display region 101, a path along which the first reaction light impinges to the polarizer 11 is not blocked by the driving circuit 48, the signal traces 211 and the sub-pixels 221, thereby facilitating $I_3^-$ ions and $I_5^-$ ions in the polarizer 11 being decomposed into $I_2$ molecules and $I^-$ ions rapidly. In this way, the light transmittance of the polarizer 11 in the first display region 101 is increased, and the external natural light incident on the imaging module 12 is increased, thereby improving the imaging effect of the imaging module 12.

Figure 28:
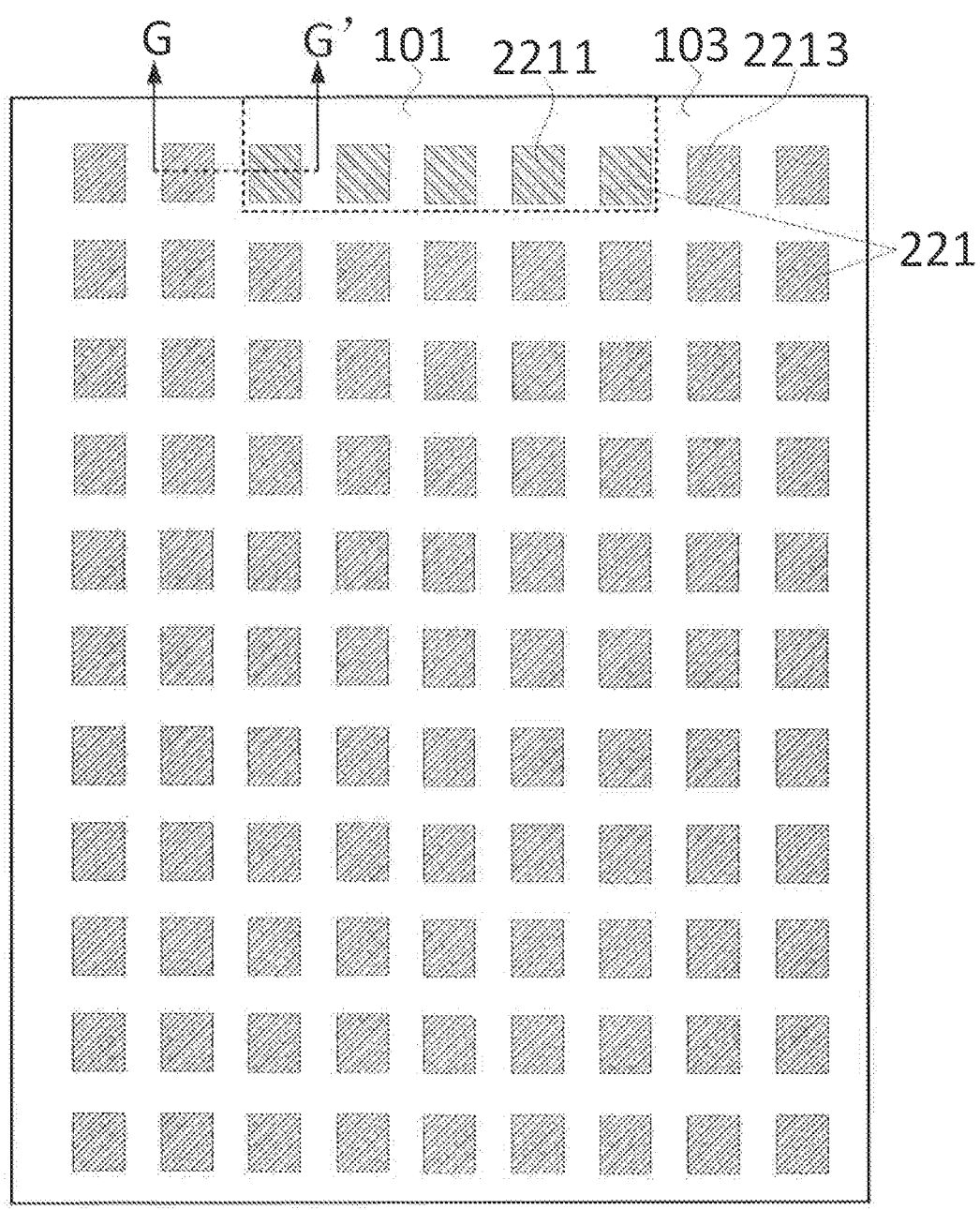
FIG. 28 is a structure view of another display device according to an embodiment of the present disclosure.
Figure 29:
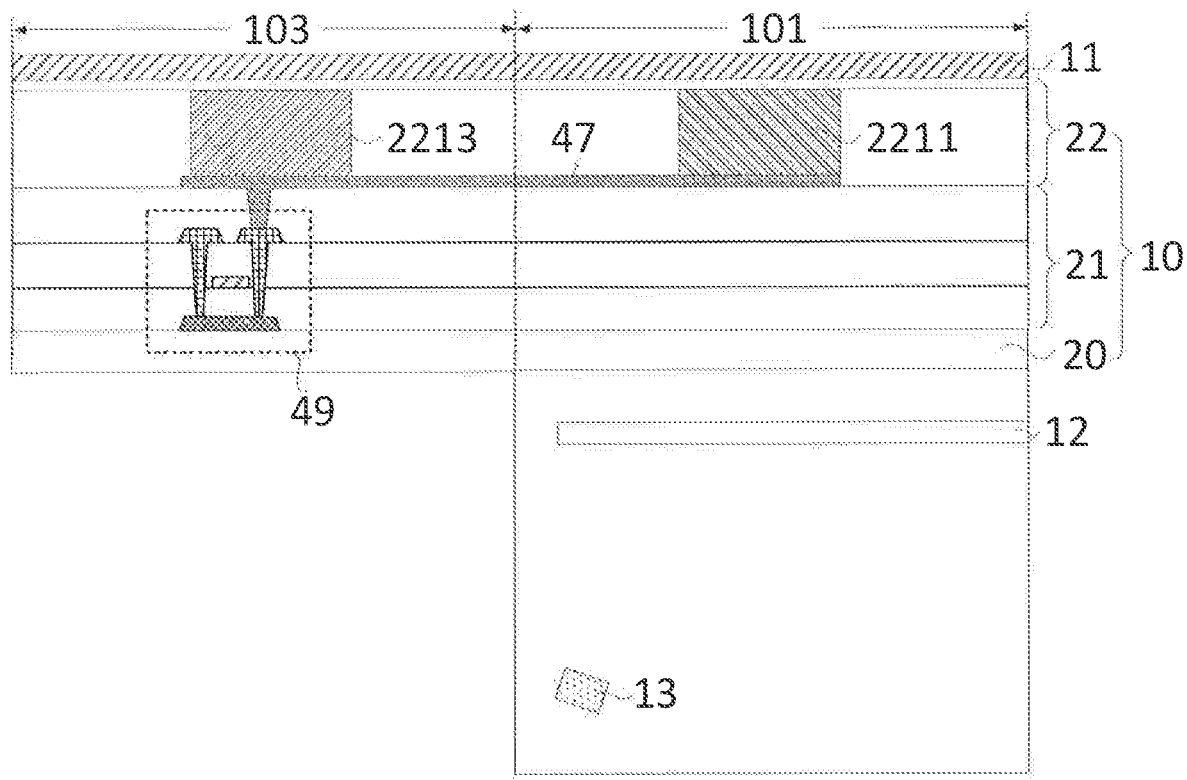
FIG. 29 is a sectional structure view taken along G-G' of FIG. 28.

FIG. 28 is a structure view of another display device according to an embodiment of the present disclosure. FIG. 29 is a sectional structure view taken along G-G' of FIG. 28. As shown in FIG. 28 and FIG. 29, in an embodiment, the display panel 10 further includes a second display region 103. The first display region 101 includes a plurality of first sub-pixels 2211, and the plurality of first sub-pixels 2211 have a first sub-pixel density. The second display region 103 includes a plurality of second sub-pixels 2213, the plurality of second sub-pixels 2213 have a second sub-pixel density, and the first sub-pixel density is the same as the second sub-pixel density.

As shown in FIG. 28 and FIG. 29, the first sub-pixel density of the first display region 101 is the same as the second sub-pixel density of the second display region 103, such that the first display region 101 has a same pixel density and an image display effect as the second display region 103, and no apparent boundary exists between the first display region 101 and the second display region 103, thereby improving the user experience.

Still referring to FIG. 28 and FIG. 29, in an embodiment, the plurality of driving circuits include a second driving circuit 49, and a part of the second driving circuit 49 is configured to drive the first sub-pixel 2211 and the second sub-pixel 2213 to emit light. The second driving circuit 49 is disposed in the second display region 103, the second driving circuit 49 is electrically connected to the first sub-pixel 2211 and the second sub-pixel 2213 through a connection trace 47, and the connection trace 47 disposed in the first display region 101 includes a transparent trace.

In an embodiment, as shown in FIG. 28 and FIG. 29, the second driving circuit 49 is electrically connected to the first sub-pixel 2211 and the second sub-pixel 2213 through the connection trace 47, so as to drive the first sub-pixel 2211 and the second sub-pixel 2213 to emit light. In this way, the display function of the first display region 101 and the display function of the second sub-pixel 2213 are achieved. The second driving circuit 49 is disposed in the second display region 103 adjacent to the first display region 101 so as to prevent the second driving circuit 49 from blocking the first display region 101. In this way, the light transmittance of the first display region 101 is increased, and the external natural light incident on the imaging module 12 is increased, thereby improving the imaging effect of the imaging module 12.

In addition, the connection trace 47 disposed in the first display region 101 is set as a transparent trace such that the connection trace 47 can be prevented from blocking the first display region 101, thereby further improving the light transmittance of the first display region 101 and improving the imaging effect of the imaging module 12.

In an embodiment, the display panel 10 includes a liquid crystal display panel, an organic light-emitting display panel, a micro diode display panel or a quantum dot display panel.

Figure 30:
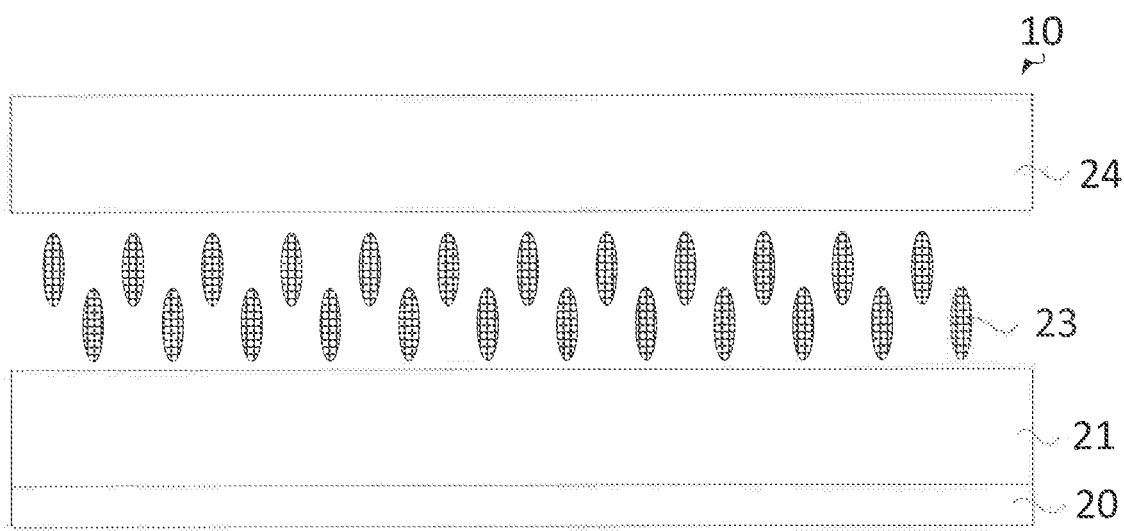
FIG. 30 is a structure view of a liquid crystal display panel according to an embodiment of the present disclosure.

FIG. 30 is a structure view of a liquid crystal display panel according to an embodiment of the present disclosure. As shown in FIG. 30, the display panel 10 being the liquid crystal display panel is described as an example. The display panel 10 includes a substrate 20, a driving circuit layer 21, a liquid crystal layer 23 and a color filter substrate 24, and the image display is achieved by controlling the rotation of liquid crystal molecules in the liquid crystal layer 23.

In other embodiments, the display panel 10 may further adopt other types of display panels such as the organic light-emitting display panel, the micro diode display panel or the quantum dot display panel, which is not specifically limited in the present disclosure. No matter what kind of display panel is adopted, the display device provided by this embodiment of the present disclosure has the beneficial effects of the display devices provided by the above embodiments. For details of the beneficial effects, reference may be made to the specific description of the display devices in the above embodiments, and the beneficial effects will not be repeated in this embodiment.

In the display device provided by the embodiments of the present disclosure, the display device is provided with the first reaction light emitting unit, such that when the imaging module works, the first reaction light emitting unit emits the first reaction light to the first display region. The $I_3^-$ ions and is ions in the polarizer are decomposed into $I_2$ molecules and $I^-$ ions under the action of the first reaction light with varying degrees by utilizing the photochemical reaction characteristics of the iodine atoms in the polarizer, such that the polarizer is adjusted from the polarized state to the unpolarized state and loses the polarization function to be transparent. In this way, the light transmittance of the polarizer in the first display region is increased, and the external natural light incident on the imaging module is increased, thereby improving the imaging effect of the imaging module. The second reaction light emitting unit is provided and emits the second reaction light to the first display region so as to supplement the thermal excitation source to the polarizer in the first display region to accelerate the forward reaction. In this way, $I_2$ molecules react with $I^-$ ions rapidly to generate $I_3^-$ ions and $I_5^-$ ions such that the light sensitive structure enables the polarizer to be adjusted from the unpolarized state to the polarized state quickly under the action of the second reaction light, thereby ensuring the image display effect. In addition, the first display region is provided with the light-shielding layer, and the light-shielding layer is at least overlapped with the sub-pixels such that the first reaction light emitted from the first reaction light emitting unit can be prevented from impinging onto the sub-pixels, thereby protecting the sub-pixels and ensuring the reliability of the sub-pixels. Furthermore, the light-shielding layer is patterned such that the first reaction light emitted from the first reaction light emitting unit can be prevented from impinging onto the sub-pixels. In this way, the polarizer at the sub-pixel can normally achieve the polarization function, and the sub-pixel is ensured to have no color cast during display. The first reaction light may impinge onto the polarizer through gaps between adjacent light-shielding chains or the mesh of the light-shielding grid, such that a light transmittance of a local region of the polarizer impinged by the first reaction light is increased, and the external natural light incident on the imaging module is increased, thereby improving the imaging effect of the imaging module.

Figure 31:
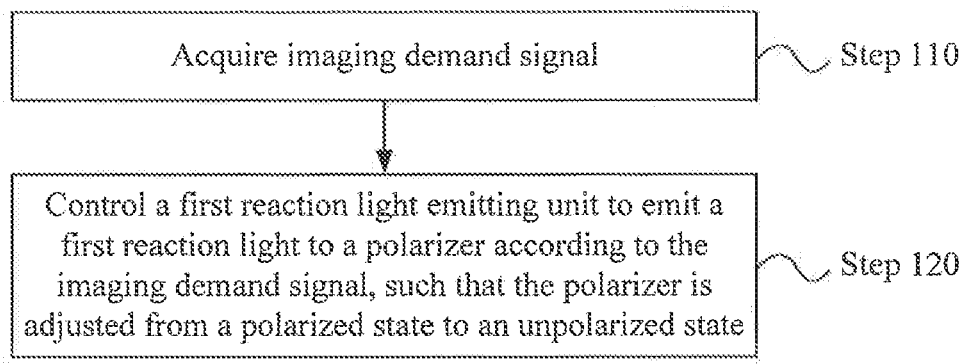
FIG. 31 is a flowchart of a control method for a display device according to an embodiment of the present disclosure.

Based on the same inventive concept, an embodiment of the present disclosure further provides a control method for a display device, and the control method is applied to any one of display devices in the above embodiments. Structures and explanations of terms which are the same as or correspond to the above embodiments are not repeated herein. FIG. 31 is a flowchart of a control method for a display device according to an embodiment of the present disclosure. As shown in FIG. 31, the control method includes steps described below.

In step 110, an imaging demand signal is acquired.

In step 120, a first reaction light emitting unit is controlled to emit a first reaction light to a polarizer according to the imaging demand signal, such that the polarizer is adjusted from a polarized state to an unpolarized state.

When the display device needs to perform camera shooting, the display device acquires the imaging demand signal, and the first reaction light emitting unit emits the first reaction light to a first display region. At this time, a light sensitive structure in the polarizer enables the polarizer to be adjusted from the polarized state to the unpolarized state under the action of the first reaction light, a light transmittance of the polarizer in the first display region is increased, and the external natural light incident on the imaging module is increased, thereby improving the imaging effect of the imaging module.

In an embodiment, after the first reaction light emitting unit is controlled to emit the first reaction light to the polarizer according to the imaging demand signal, the control method further includes a step described below.

After a preset time, the first reaction light emitting unit is controlled to stop emitting the first reaction light to the polarizer, and the preset time is less than a recognition time of human eyes.

Since the process that the first reaction light impinges onto the polarizer such that the light sensitive structure adjusts the polarizer from the polarized state to the unpolarized state under the action of the first reaction light is extremely fast, the preset time may be set to be less than 0.225 seconds by which human eyes can recognize, such that the human eyes can be prevented from being influenced, thereby improving the user experience.

In an embodiment, the display device further includes a second reaction light emitting unit, the second reaction light emitting unit is configured to emit a second reaction light to the first display region, and the light sensitive structure is configured to adjust the polarizer from the unpolarized state to the polarized state under the action of the second reaction light.

The control method for the display device further includes steps described below.

A display demand signal is acquired.

The second reaction light emitting unit is controlled to emit the second reaction light to the polarizer according to the display demand signal, such that the polarizer is adjusted from the unpolarized state to the polarized state.

When the display device stops the camera shooting, the display device acquires the display demand signal, and the second reaction light emitting unit emits the second reaction light to the first display region so as to supplement a thermal excitation source to the polarizer in the first display region, such that the light sensitive structure enables the polarizer to be adjusted from the unpolarized state to the polarized state quickly under the action of the second reaction light, thereby ensuring the image display effect.

It is to be noted that the above are merely preferred embodiments of the present disclosure and the technical principles used therein. It is to be understood by those skilled in the art that the present disclosure is not limited to the specific embodiments described herein. Those skilled in the art can make various apparent modifications, adaptations and substitutions without departing from the scope of the present disclosure. Therefore, while the present disclosure has been described in detail through the preceding embodiments, the present disclosure is not limited to the preceding embodiments and may further include more other equivalent embodiments without departing from the concept of the present disclosure. The scope of the present disclosure is determined by the scope of the appended claims.

What is claimed is:

1. A display device, comprising:
a display panel,
a polarizer,
an imaging module, and
a first reaction light emitting unit; wherein the polarizer is disposed on a light-emitting side of the display panel, and the imaging module is disposed on a non-light-emitting side of the display panel;
wherein the display panel comprises a first display region, and in a direction perpendicular to the polarizer, the polarizer covers the first display region and the imaging module is at least partially overlapped with the first display region;
wherein the polarizer comprises a polarized state and an unpolarized state, and a light transmittance of the polarizer in the unpolarized state is greater than a light transmittance of the polarizer in the polarized state;
wherein the first reaction light emitting unit is configured to emit a first reaction light to the first display region; and
wherein the polarizer comprises a light sensitive structure, and the light sensitive structure is configured to adjust the polarizer from the polarized state to the unpolarized state under the action of the first reaction light;
wherein the display device further satisfies at least one of following characteristics;
the light sensitive structure comprises iodine particles; in responding to the polarizer being in the polarized state, the iodine articles have a first state and comprise I3– ions and I5– ions in the first state; and in responding to the polarizer being in the unpolarized state, the iodine particles have a second state and comprise I2 molecules and I– ions in the second state;
the display device further comprising a light-shielding layer, wherein the display panel comprising a substrate, a driving circuit layer, and a light emitting structure layer, wherein the light emitting structure layer comprises a plurality of sub-pixels; in the direction perpendicular to the polarizer, the light-shielding layer is at least partially overlapped with the first display region; and the light-shielding layer comprise a plurality of first light-shielding sections, and in the direction perpendicular to the polarizer, the plurality of first light-shielding sections are at least partially overlapped with the plurality of sub-pixels; or
the display panel comprises a substrate, a driving circuit layer and a light emitting structure layer, the driving circuit layer comprises a plurality of driving circuits, the light emitting structure layer comprises a plurality of sub-pixels, the plurality of sub-pixels comprise a first sub-pixel disposed in the first display region, the plurality of driving circuits comprise a first driving circuit, and the first driving circuit is configured to drive the first sub-pixel to emit light; and the display panel further comprises a transition display region, and the first driving circuit is disposed in the transition display region; and the first driving circuit is electrically connected to the first sub-pixel through a connection trace, and the connection trace disposed in the first display region comprises a transparent trace.

2. The display device of claim 1, wherein the light sensitive structure comprises iodine particles; in responding to the polarizer being in the polarized state, the iodine particles have a first state and comprise I3– ions and I5– ions in the first state; and in responding to the polarizer being in the unpolarized state, the iodine particle have a second state and comprise I2 molecules and I– ions in the second state;
wherein the polarizer comprises a polyvinyl alcohol layer, and the polyvinyl alcohol layer comprises a plurality of polyvinyl alcohol molecules; and
the iodine particles are disposed in a space defined by the plurality of polyvinyl alcohol molecules.

3. The display device of claim 1, wherein the imaging module comprises a photosensitive chip, a supporting frame, a focusing aperture and a lens; and
the first reaction light emitting unit is disposed on the supporting frame.

4. The display device of claim 1, wherein the first reaction light emitting unit is disposed independently.

5. The display device of claim 1, further comprising a second reaction light emitting unit; wherein
the second reaction light emitting unit is configured to emit a second reaction light to the first display region; and
the light sensitive structure is further configured to adjust the polarizer from the unpolarized state to the polarized state under the action of the second reaction light.

6. The display device of claim 5, wherein the light sensitive structure comprises iodine particles;
the first reaction light comprises a blue-green laser; and
the second reaction light comprises an infrared laser.

7. The display device of claim 1, further comprising a light-shielding layer, wherein the display panel comprises a substrate, a driving circuit layer, and a light emitting structure layer, wherein the light emitting structure layer comprises a plurality of sub-pixels;
in the direction perpendicular to the polarizer, the light-shielding layer is at least partially overlapped with the first display region; and
the light-shielding layer comprises a plurality of first light-shielding sections, and in the direction perpendicular to the polarizer the plurality of first light-shielding sections are at least partially overlapped with the plurality of sub-pixels;
wherein the light-shielding layer further comprises a plurality of second light-shielding sections; the plurality of second light-shielding sections are connected to the plurality of first light-shielding sections so as to form a plurality of light-shielding chains, and the first reaction light is configured to be incident on the polarizer by passing through a gap between two adjacent light-shielding chains among the plurality of light-shielding chains; or the plurality of second light-shielding sections are connected to the plurality of first light-shielding sections so as to form a light-shielding grid, and the first reaction light is configured to be incident on the polarizer by passing through a mesh of the light-shielding grid;
and
the driving circuit layer comprises a signal trace, and in the direction perpendicular to the polarizer, the plurality of second light-shielding sections are at least partially overlapped with the signal trace.

8. The display device of claim 1, further comprising a light-shielding layer, wherein the display panel comprises a substrate, driving circuit layer, and a tight emitting structure layer, wherein the light emitting structure layer comprises a plurality of sub-pixels;
in the direction perpendicular to the polarizer, the light-shielding layer is at least partially overlapped with the first display region; and
the light-shielding layer comprises a plurality of first light-shielding sections, and in the direction perpendicular to the polarizer, the plurality of first light-shielding sections are at least partially overlapped with the plurality of sub-pixels;
wherein the light-shielding layer comprises a metal light-shielding layer.

9. The display device of claim 8, wherein the light-shielding layer is disposed on one side of the substrate facing towards the driving circuit layer;
the driving circuit layer comprises a plurality of driving circuits, each of the plurality of driving circuits comprises a transistor, the transistor comprises an active layer and a gate, and the gate is disposed on one side of the active layer facing towards the substrate; and
the gate and the light-shielding layer are disposed in a same layer.

10. The display device of claim 8, wherein the light-shielding layer is disposed on one side of the substrate facing towards the driving circuit layer;
the driving circuit layer comprises a plurality of driving circuits, each of the plurality of driving circuits comprises a capacitive structure, and the capacitive structure comprises a first capacitor plate and a second capacitor plate; and
the first capacitor plate and the light-shielding layer are disposed in a same layer, or the second capacitor plate and the light-shielding layer are disposed in a same layer.

11. The display device of claim 8, further comprising a conductive metal layer, wherein the light-shielding layer is disposed on one side of the substrate facing away from the driving circuit layer; and
the conductive metal layer and the metal light-shielding layer are disposed in a same layer.

12. The display device of claim 1, wherein the display panel comprises a substrate, a driving circuit layer and a light emitting structure layer, the driving circuit layer comprises a plurality of driving circuits and a plurality of signal traces, and the light emitting structure layer comprises a plurality of sub-pixels; and
in the direction perpendicular to the polarizer, the plurality of driving circuits, the plurality of signal traces and the plurality of sub-pixels do not overlap with the first display region.

13. The display device of claim 1, wherein the display panel further comprises a second display region; and
the first display region comprises a plurality of first sub-pixels, and the plurality of first sub-pixels have a first sub-pixel density;

the second display region comprises a plurality of second sub-pixels, and the plurality of second sub-pixels have a second sub-pixel density; and the first sub-pixel density is the same as the second sub-pixel density.

14. The display device of claim 1, wherein the display panel comprises a liquid crystal display panel, an organic light-emitting display panel, a micro diode display panel or a quantum dot display panel.

15. A control method for a display device, applied to the display device, wherein the display device comprises:
a display panel,
a polarizer,
an imaging module, and
a first reaction light emitting unit; wherein the polarizer is disposed on a light-emitting side of the display panel, and the imaging module is disposed on a non-light-emitting side of the display panel;
wherein the display panel comprises a first display region, and in a direction perpendicular to the polarizer, the polarizer covers the first display region and the imaging module is at least partially overlapped with the first display region;
wherein the polarizer comprises a polarized state and an unpolarized state, and a light transmittance of the polarizer in the unpolarized state is greater than a light transmittance of the polarizer in the polarized state;
wherein the first reaction light emitting unit is configured to emit a first reaction light to the first display region; and
wherein the polarizer comprises a light sensitive structure, and the light sensitive structure is configured to adjust the polarizer from the polarized state to the unpolarized state under the action of the first reaction light, the control method comprising:
acquiring an imaging demand signal; and
controlling the first reaction light emitting unit to emit the first reaction light to the polarizer according to the imaging demand signal, such that the polarizer is adjusted from the polarized state to the unpolarized state.

16. The control method for the display device of claim 15, wherein after controlling the first reaction light emitting unit to emit the first reaction light to the polarizer according to the imaging demand signal, the control method further comprises:
after a preset time, controlling the first reaction light emitting unit to stop emitting the first reaction light to the polarizer; wherein the preset time is less than a recognition time of human eyes.

17. The control method for the display device of claim 15, wherein the display device further comprises a second reaction light emitting unit;
the second reaction light emitting unit is configured to emit a second reaction light to the first display region; and
the light sensitive structure is configured to adjust the polarizer from the unpolarized state to the polarized state under the action of the second reaction light; and
the control method further comprising:
acquiring a display demand signal; and
controlling the second reaction light emitting unit to emit the second reaction light to the polarizer according to the display demand signal, such that the polarizer is adjusted from the unpolarized state to the polarized state.

* * * * *